(12) United States Patent
Toba et al.

(10) Patent No.: US 9,373,084 B2
(45) Date of Patent: Jun. 21, 2016

(54) COMPUTER SYSTEM AND INFORMATION PRESENTATION METHOD USING COMPUTER SYSTEM

(75) Inventors: Minako Toba, Tokyo (JP); Yasuhide Mori, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 328 days.

(21) Appl. No.: 13/878,885

(22) PCT Filed: Mar. 23, 2011

(86) PCT No.: PCT/JP2011/056936
§ 371 (c)(1),
(2), (4) Date: May 8, 2013

(87) PCT Pub. No.: WO2012/127646
PCT Pub. Date: Sep. 27, 2012

(65) Prior Publication Data
US 2013/0232102 A1    Sep. 5, 2013

(51) Int. Cl.
| G06Q 10/10 | (2012.01) |
| G06Q 10/04 | (2012.01) |
| G06Q 50/06 | (2012.01) |
| G06N 5/04 | (2006.01) |

(52) U.S. Cl.
CPC .................. *G06N 5/04* (2013.01); *G06Q 10/04* (2013.01); *G06Q 10/10* (2013.01); *G06Q 50/06* (2013.01)

(58) Field of Classification Search
None
See application file for complete search history.

(56) References Cited

U.S. PATENT DOCUMENTS

2010/0088072 A1    4/2010    Hayashi et al.

FOREIGN PATENT DOCUMENTS

| JP | 2000-222427 A | 8/2000 |
| JP | 2004-348682 A | 12/2004 |
| JP | 2005-222377 A | 8/2005 |
| JP | 2010-086476 A | 4/2010 |

OTHER PUBLICATIONS

Diantono et al., "1101. Information Retrieval for Intelligent Information Integration in Nuclear Power Plant", Journal of the Atomic Energy Society of Japan, vol. 42, Atomic Energy Society of Japan, Nov. 30, 2000, pp. 1215 to 1225.
Yasuhide Mori et al., "Chiteki Sagyo Shien no Tameno Text Database ni Motozuku Gazo Rikai", Dai 9 Kai Godo Kenkyukai "AI Simposium '98" Shiryo, Dec. 9, 1998, pp. 101 to 106, SIG-J-9801.

Primary Examiner — Stanley K Hill
Assistant Examiner — Nathan Brown, Jr.
(74) Attorney, Agent, or Firm — Mattingly & Malur, PC

(57) ABSTRACT

A computer system includes a processor for executing a program, a computer holding the program executed by the processor, a first database holding relevance between physical amounts measured under conditions different in at least one of time and place, and a second database holding relevance between pieces of information including texts and corresponding to the measured physical amounts. The processor is configured to: calculate, based on the relevance between the physical amounts held in the first database and the relevance between the pieces of information in the second database, relevance between each of the measured physical amounts and each of the pieces of information, and hold the calculated relevance between each of the physical amounts and each of the pieces of information in a third database; and refer to, when the physical amounts are input, the third database to present information highly relevant to the input physical amounts.

20 Claims, 27 Drawing Sheets

FIG.6

| ANALYSIS ID | SUBJECT BUILDING | PERIOD FOR ANALYSIS | DATE OF ANALYSIS | TIME OF ANALYSIS | ENERGY CONSUMPTION ANALYSIS RESULT ||| ANALYSIS RESULT ||
|---|---|---|---|---|---|---|---|---|
| | | | | | STANDARD DEVIATION FROM SAME PERIOD LAST YEAR (σ) | STANDARD DEVIATION WITHIN BUILDINGS OF SAME SCALE (σ) | ANALYSIS ON RELATION TO OUTSIDE TEMPERATURE | COMPREHENSIVE ANALYSIS (σ) |
| 1 | CO., LTD. KOCHI BUILDING | 2009/07 | 2010/11/15 | 17:18:25 | 1.2 | 0.2 | 2.2 | 0.5 |
| 2 | CO., LTD. KOCHI BUILDING | 2009/10 | 2010/11/15 | 17:18:25 | 1.3 | 0.2 | 1.4 | 0.4 |
| 3 | CO., LTD. KOCHI BUILDING | 2010/01 | 2010/11/15 | 17:18:25 | 0.6 | -0.1 | -0.8 | 0.1 |
| 4 | CO., LTD. KOCHI BUILDING | 2010/04 | 2010/11/15 | 17:18:25 | -0.2 | -0.8 | -1.5 | -0.7 |
| 5 | CO., LTD. KOCHI BUILDING | 2010/07 | 2010/11/15 | 17:18:25 | 1.5 | 0.6 | -0.3 | 0.6 |
| ... | ... | ... | ... | ... | ... | ... | ... | ... |

FIG.15

| SUBJECT KNOWLEDGE ID | INPUT KNOWLEDGE ID | NUMBER OF MATCHING NOUS | KNOWLEDGE RELEVANCE |
|---|---|---|---|
| K | 1 | 0 | 0 |
| K | 2 | 0 | 0 |
| K | 3 | 4 | 100 |
| ... | ... | ... | ... |
| K | K-1 | 3 | 75 |

FIG.16A

BUILDING ENERGY SAVING ANALYSIS — □ ☒

[ RETURN ] [ LOGOUT ]

【ANALYSIS RESULT】

SUBJECT BUILDING: CO., LTD KOCHI BUILDING

PERIOD FOR ANALYSIS: 2010 YEAR 08 MONTH

ANALYSIS RESULT TABLE:

| ENERGY CONSUMPTION STATUS ANALYSIS RESULT | | | | |
|---|---|---|---|---|
| ... | ... | ... | ... | ... |
| 235 | 1.2 | 0.2 | 2.2 | 0.5 |

ANALYSIS RESULT GRAPH:

(Scatter plot: ORIGINAL ENERGY UNIT (MJ/m²) vs TOTAL FLOOR AREA (m²))

【KNOWLEDGE RECOMMENDATION TO SALES PERSON】

| ORDER OF RELEVANCE | KNOWLEDGE | KNOWLEDGE ID | SUBJECT BUILDING AT TIME OF INPUT | PERIOD FOR ANALYSIS AT TIME OF INPUT |
|---|---|---|---|---|
| 1 | .... | 1 | AA BUILDING | 2007/08 |
| 2 | .... | 32 | BB BUILDING | 2008/07 |
| 3 | .... | 13 | EE BUILDING | 2005/04 |

[ DISPLAY NODE MAP ]

【KNOWLEDGE INPUT BY SKILLED PERSON】

INPUT KNOWLEDGE:

PLEASE INPUT YOUR KNOWLEDGE

[ INPUT ]

| ENERGY CONSUMPTION STATUS ANALYSIS RESULT ||||| 
|---|---|---|---|---|
| ORIGINAL ENERGY UNIT (MJ/m²) | STANDARD DEVIATION FROM SAME PERIOD LAST YEAR (σ) | STANDARD DEVIATION WITHIN BUILDINGS OF SAME SCALE (σ) | ANALYSIS ON CORRELATION TO OUTSIDE TEMPERATURE (σ) | COMPREHENSIVE ANALYSIS (σ) |
| 235 | 1.2 | 0.2 | 2.2 | 0.5 |

FIG.16C

【KNOWLEDGE RECOMMENDATION TO SALES PERSON】

1510

| ORDER OF RELEVANCE | KNOWLEDGE | KNOWLEDGE ID | SUBJECT BUILDING AT TIME OF INPUT | PERIOD FOR ANALYSIS AT TIME OF INPUT |
|---|---|---|---|---|
| 1 | AIR CONDITIONING COP HAS TENDENCY OF DETERIORATING. ON-SITE INSPECTION RECOMMENDED ASSUMING REPLACEMENT. | 1 | AA BUILDING | 2007/08 |
| 2 | .... | 32 | BB BUILDING | 2008/07 |
| 3 | .... | 13 | EE BUILDING | 2005/04 |

FIG.22

BUILDING ENERGY SAVING ANALYSIS

[KNOWLEDGE RECOMMENDATION TO SALES PERSON]

| ORDER OF RELEVANCE | KNOWLEDGE | KNOWLEDGE ID | SUBJECT BUILDING AT TIME OF INPUT | PERIOD FOR ANALYSIS AT TIME OF INPUT | <PLEASE INPUT RATING> UNUSEFUL⇔USEFUL |
|---|---|---|---|---|---|
| 1 | AIR CONDITIONING COP HAS TENDENCY OF DETERIORATING. ON-SITE INSPECTION RECOMMENDED ASSUMING REPLACEMENT. | 1 | AA BUILDING | 2007/08 | ☆ ☆ ★ ☆ ☆ <br> 1 2 3 4 5 |
| 2 | ... | 32 | BB BUILDING | 2008/07 | ☆ ☆ ☆ ☆ ☆ <br> 1 2 3 4 5 |
| 3 | ... | 13 | EE BUILDING | 2005/04 | ☆ ☆ ☆ ☆ ☆ <br> 1 2 3 4 5 |

DISPLAY NODE MAP

FIG.23

| ANALYSIS ID | KNOWLEDGE ID | NUMBER OF RATINGS | AVERAGE RATING | NORMALIZED AVERAGE RATING VALUE |
|---|---|---|---|---|
| 1 | 34 | 15 | 4.2 | 72 |
| 1 | 33 | 3 | 3.1 | 58 |
| 1 | 106 | 8 | 1.0 | 45 |
| ... | ... | ... | ... | ... |

COMPUTER SYSTEM AND INFORMATION PRESENTATION METHOD USING COMPUTER SYSTEM

BACKGROUND

This invention relates to a computer system for presenting information highly relevant to an input physical amount, and an information presentation method using a computer system.

Patent Literature 1 discloses a design supporting apparatus using CAD, in which basic shape data associated with CAD model data is extracted, know-how data associated with the basic shape data is extracted, model data and the know-how data are associated with each other, and a degree of association between the model data and the know-how data is set.

Moreover, Patent Literature 2 discloses a technology of calculating, based on cooccurrence information of words constituting a document and a similarity of the words in view of linguistic features, relevance between the words.

Further, Patent Document 3 discloses a system for finding a target customer for a specific article from SFA information and a WEB access log and presenting the found target customer to a sales person.

Patent Literature 1: Japanese Patent Application Laid-open No. 2010-86476

Patent Literature 2: Japanese Patent Application Laid-open No. 2000-222427

Patent Literature 3: Japanese Patent Application Laid-open No. 2004-348682

SUMMARY

Meanwhile, there has been known a system for presenting information highly relevant to an input physical amount. When the technology of each of Patent Literature 1 to Patent Literature 3 is applied to the system, relevance between the physical amount and the physical amount, or between information and information may be calculated, and information highly relevant to the input physical amount may be presented based on the calculated relevance. However, with the method, there has been a problem in that the calculation of the relevance is insufficient and high-quality information cannot always be presented.

An exemplary example of this invention is a computer system including: a processor for executing a program; a computer for holding the program executed by the processor; a first database for holding relevance between physical amounts measured under conditions that are different in at least one of time and place; and a second database for holding relevance between pieces of information including texts and corresponding to the measured physical amounts, wherein the processor is configured to: calculate, based on the relevance between the physical amounts held in the first database and the relevance between the pieces of information held in the second database, relevance between each of the measured physical amounts and each of the pieces of information, and hold the calculated relevance between each of the physical amounts and each of the pieces of information in a third database; and refer to, when the physical amounts are input, the third database to present information highly relevant to the input physical amounts.

According to the exemplary embodiment of this invention, not only the relevance between the physical amounts or the relevance between the pieces of information, but also the relevance between the physical amounts and the information is taken into consideration so that high-quality information may be provided.

BRIEF DESCRIPTION OF THE DRAWINGS

FIG. 6 is a diagram illustrating an example of data structure of an analysis result database.

FIG. 15 is a diagram illustrating an example of data structure of a knowledge relevance database.

FIG. 16A is a diagram illustrating an example of a user interface for knowledge recommendation and input.

FIG. 16B is a diagram illustrating an example of detailed contents of an analysis result table.

FIG. 16C is a diagram illustrating an example of detailed contents of a knowledge recommendation table.

FIG. 22 is a diagram illustrating an example of a user interface for inputting ratings to recommended knowledges.

FIG. 23 is a diagram illustrating an example of data structure of a rating database.

DETAILED DESCRIPTION OF THE EMBODIMENTS

Figure 1:
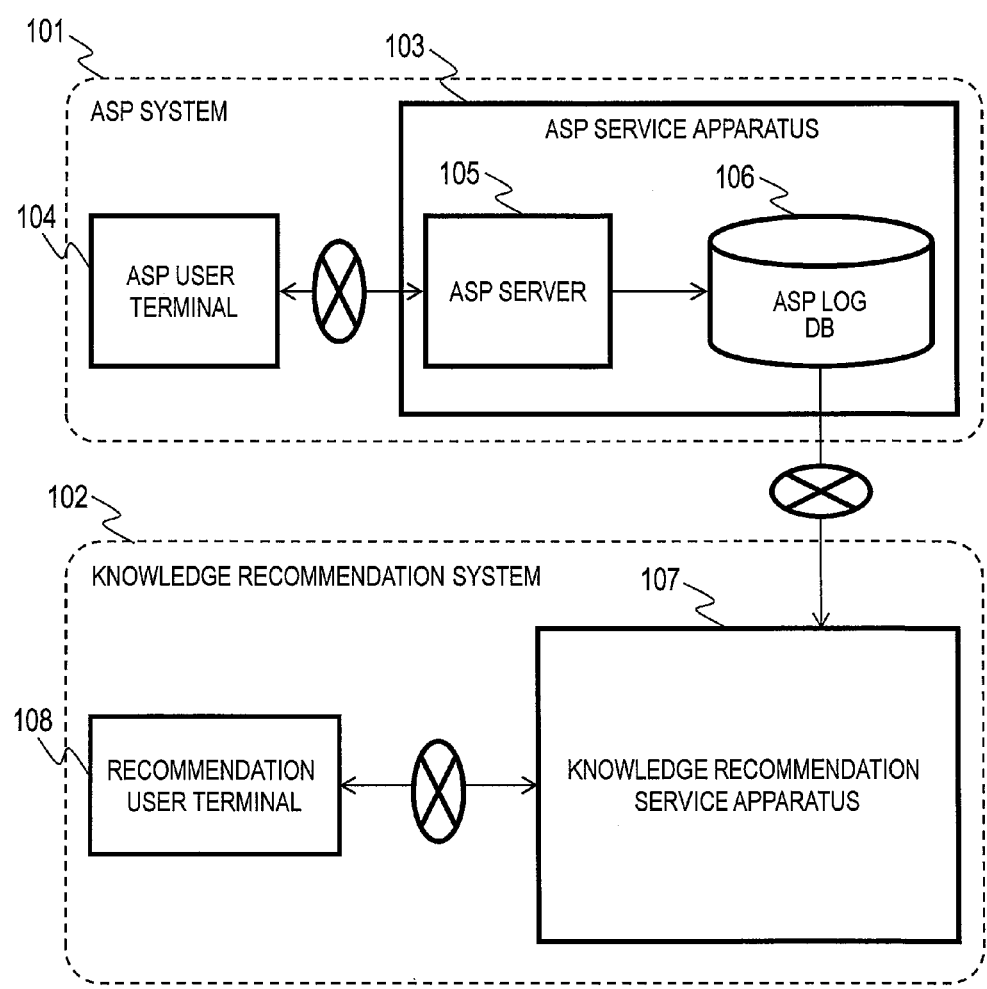
FIG. 1 is a diagram illustrating an example of a system outline of a knowledge recommendation service according to a first embodiment of this invention.

Embodiments of this invention are described below referring to the accompanying drawings. In order to clarify the description, in the following description and the drawings, some omissions and simplification are made as needed. Further, the same reference numerals are given to the same elements throughout the drawings to avoid redundant descriptions as needed for clarification of the description.

In a computer system according to this invention, when a physical amount is input, information highly relevant to the input physical amount is presented. Examples in which the computer system according to this invention is applied to a knowledge recommendation service for a building management business are hereinafter described as first and second embodiments of this invention. An example in which the computer system according to this invention is applied to a building energy management system—daily report combined analysis tool is also described as a third embodiment of this invention. It should be noted, however, that the computer system according to this invention is applicable not only to the building management business but also to other fields of services or businesses such as a financial business and e-commerce.

First Embodiment

Now, the first embodiment of this invention is described with reference to FIGS. 1 to 19. The knowledge recommendation service of this embodiment acquires, in the building management business, an energy usage amount of a building and recommends (presents) to a user knowledges of a building operation for the purpose of an energy saving operation, a sales method for an energy-saving commercial material and an energy saving service, and the like. The user as a subject of the recommendation is a sales person or the like of a business organization that conducts the building management business.

FIG. 1 is a diagram illustrating an example of a system outline of the knowledge recommendation service in the first embodiment. The knowledge recommendation service includes an ASP system 101 and a knowledge recommendation system 102.

The ASP system 101 includes an ASP service apparatus 103 and an ASP user terminal 104. The ASP service apparatus 103 and the ASP user terminal 104 are coupled via a network. FIG. 1 illustrates only one ASP user terminal 104, but a plurality of ASP user terminals 104 are coupled to the ASP service apparatus 103.

The ASP service apparatus 103 includes an ASP server 105 and an ASP log database 106. In this embodiment, the ASP server 105 provides an energy management service for building management.

An ASP user who uses the ASP user terminal 104 is, for example, a manager or a building owner of each building. The ASP user inputs to the ASP user terminal 104 a monthly energy usage amount and the like of the building. Input data such as the energy usage amount is transmitted to the ASP server 105 via the network and then stored in the ASP log database 106. The ASP server 105 visualizes the monthly energy usage amount in a graph or the like and transmits the visualized monthly energy usage amount to the ASP user terminal 104 via the network.

The knowledge recommendation system 102 includes a knowledge recommendation service apparatus 107 and a recommendation user terminal 108. The knowledge recommendation service apparatus 107 and the recommendation user terminal 108 are coupled via a network.

A sales person (recommendation user) of the business organization that conducts the building management business inputs to the recommendation user terminal 108 a request for knowledges for a particular building. The input request is transmitted to the knowledge recommendation service apparatus 107 via the network. Based on the received request, the knowledge recommendation service apparatus 107 acquires a log of the corresponding building from the ASP log database 106 via a network. Thereafter, the knowledge recommendation service apparatus 107 performs processing such as analysis on the acquired log and transmits knowledges and information corresponding to the analysis result to the recommendation user terminal 108 via the network.

Figure 2:
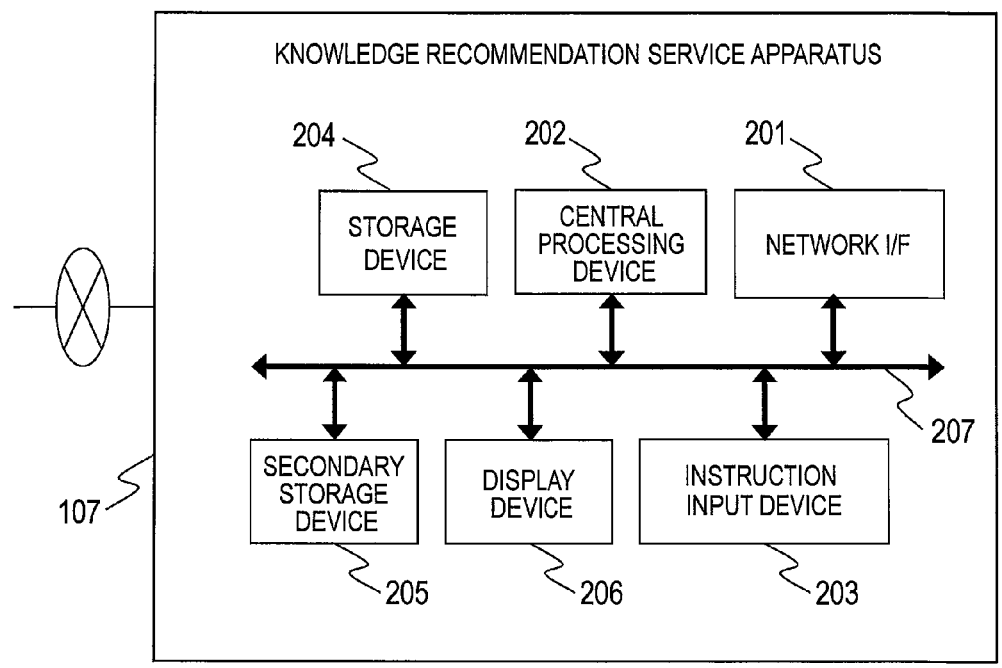
FIG. 2 is a diagram illustrating an example of a hardware configuration of a knowledge recommendation service apparatus.

FIG. 2 is a diagram illustrating an example of a hardware configuration of the knowledge recommendation service apparatus 107. The knowledge recommendation service apparatus 107 includes a network I/F 201, a central processing device 202, an instruction input device 203, a storage device 204, a secondary storage device 205, and a display device 206. The devices are connected via an internal bus 207, and may transmit/receive data to/from one another via the internal bus 207.

The network I/F 201 is, for example, a network card such as a LAN card. The knowledge recommendation service apparatus 107 transmits/receives data to/from the recommendation user terminal 108 via the network I/F 201. The knowledge recommendation service apparatus 107 also acquires through the network a log stored in the ASP log database 106 via the network I/F 201.

The central processing device 202 is mainly constituted of a microprocessor and executes programs stored in the storage device 204 and the secondary storage device 205.

The instruction input device 203 is, for example, a pointing device such as a keyboard or a mouse. An operator of the knowledge recommendation service uses the instruction input device 203 to input a setting, change, or the like of knowledge recommendation. It should be noted, however, that the operator may use an instruction input device of another terminal such as a PC coupled via a network to input the setting, change, or the like of the knowledge recommendation.

The display device 206 is constituted of, for example, a display adaptor and a liquid crystal panel or the like.

The storage device 204 is, for example, a random access memory (RAM) or a read-only memory (ROM). The storage device 204 stores programs to be executed by the central processing device 202, data to be processed in the knowledge recommendation service apparatus 107, and the like.

The secondary storage device 205 is, for example, a storage medium such as a hard disk, a DVD, or a CD and a drive therefor, or a non-volatile memory such as a flash memory. The secondary storage device 205 stores programs to be executed by the central processing device 202, data to be processed in the knowledge recommendation service apparatus 107, and the like.

Figure 3:
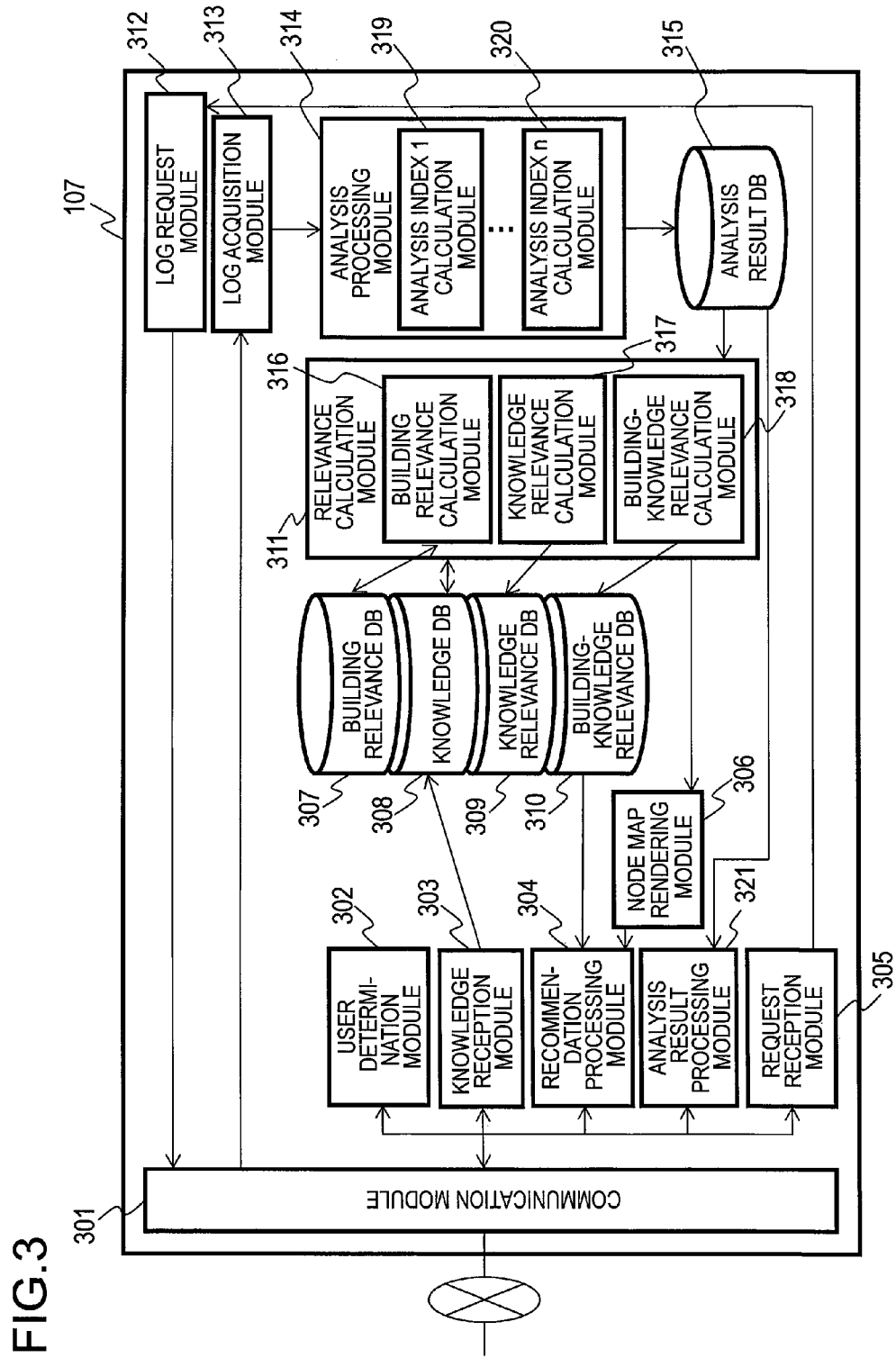
FIG. 3 is a diagram illustrating an example of functional blocks of the knowledge recommendation service apparatus.

FIG. 3 is a diagram illustrating an example of functional blocks of the knowledge recommendation service apparatus 107. Some or all of the functional blocks illustrated in FIG. 3 may be implemented as hardware in addition to the hardware illustrated in FIG. 2, but may be implemented as software programs to be executed by the central processing device 202. Note that, in the following description, as an example, all the functional blocks are the software programs to be executed by the central processing device 202, or data to be held in the secondary storage device 205.

As illustrated in FIG. 3, the knowledge recommendation service apparatus 107 includes a communication module 301, a user determination module 302, a knowledge reception module 303, a recommendation processing module 304, an analysis result processing module 321, a request reception module 305, a node map rendering module 306, a building relevance database 307, a knowledge database 308, a knowledge relevance database 309, a building-knowledge relevance database 310, a relevance calculation module 311, a log request module 312, a log acquisition module 313, an analysis processing module 314, and an analysis result database 315.

The relevance calculation module 311 includes a building relevance calculation module 316, a knowledge relevance calculation module 317, and a building-knowledge relevance calculation module 318. Processing details to be performed in the calculation modules 316 to 318 are described later.

The analysis processing module 314 includes an analysis index 1 calculation module 319 and an analysis index n calculation module 320. In this case, n is any integer. In other words, the analysis processing module 314 may include any number of analysis index n calculation modules. Detailed description of the modules is provided later.

Transmission/reception of data via network, for example, transmission/reception of data such as request/reception for/of a log to/from the ASP service apparatus 103, and transmission/reception of data such as request/reception for/of a recommendation to/from the recommendation user terminal 108 is performed via the communication module 301.

The knowledge recommendation service apparatus 107 acquires and analyzes log data to be analyzed (log to be analyzed) from the ASP log database 106. The knowledge recommendation service apparatus 107 also transmits, in response to a request from the recommendation user terminal 108, data containing a recommendation knowledge to the recommendation user terminal 108.

Figure 4:
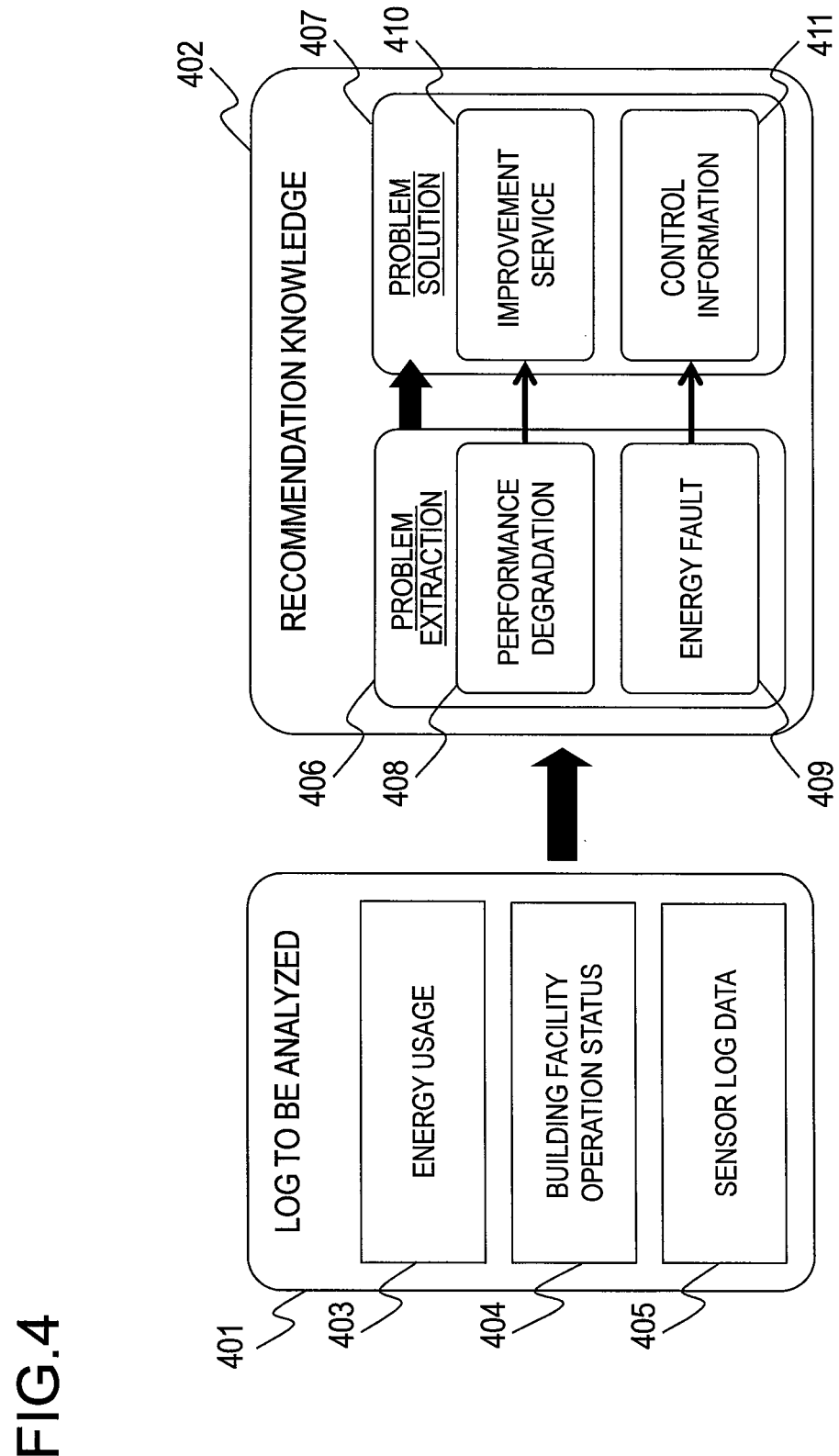
FIG. 4 is a diagram illustrating an example of a log to be analyzed and a recommendation knowledge.

FIG. 4 is a diagram illustrating an example of a log to be analyzed 401 and a recommendation knowledge 402. The log to be analyzed 401 is data which is acquired by the knowledge recommendation service apparatus 107 from the ASP log database 106. The recommendation knowledge 402 is data which is presented by the knowledge recommendation service apparatus 107 to the recommendation user terminal 108.

The log to be analyzed 401 contains an energy usage 403, a building facility operation status 404, sensor log data 405, and the like of each building. The energy usage is, for example, a monthly usage amount of electricity, gas, and oil of each building. The building facility operation status 404 is, for example, control information such as switching and setting of operations of lighting equipment, air conditioners, elevators, and the like of each building. The sensor log data 405 is, for example, data measured by sensors such as a temperature sensor, a humidity sensor, a carbon dioxide density sensor, and an illuminance sensor provided in each room of each building, a current measurement sensor provided to a switch board, and an external air temperature sensor provided outdoor.

The log to be analyzed 401 is input by a building manager or the like through the ASP user terminal 104 to be transmitted to the ASP service apparatus 103. Alternatively, data such as the energy usage 403, the building facility operation status 404, and the sensor log data 405 may be detected by a sensor (not shown) or the like to be transmitted to the ASP service apparatus 103 via a wired or wireless communication device. The log to be analyzed 401 transmitted to the ASP service apparatus 103 is stored in the ASP log database 106.

The recommendation knowledge 402 contains information on problem extraction 406 of the building obtained as the result of the analysis of the log to be analyzed 401, and information on a problem solution 407 to each of the extracted problems.

The information on the problem extraction 406 contains information on performance degradation 408 and an energy fault 409. The performance degradation 408 is, for example, information on an increase in consumed power, an error in consumed power, and the like of the air conditioners, lighting equipment, elevators, OA equipment, and the like. The energy fault 409 is information on wasteful time in operation and a specific point in operation of the air conditioners, lighting equipment, elevators, OA equipment, and the like.

The information on the problem solution 407 contains information on an improvement service 410 and control information 411. The improvement service 410 is information on suggestion for equipment replacement, adjustment of inventories of equipment, an order for equipment, and the like. The control information 411 is information for providing instructions on switching and setting of operations of the air conditioners, lighting equipment, elevators, and OA equipment.

Figure 5:
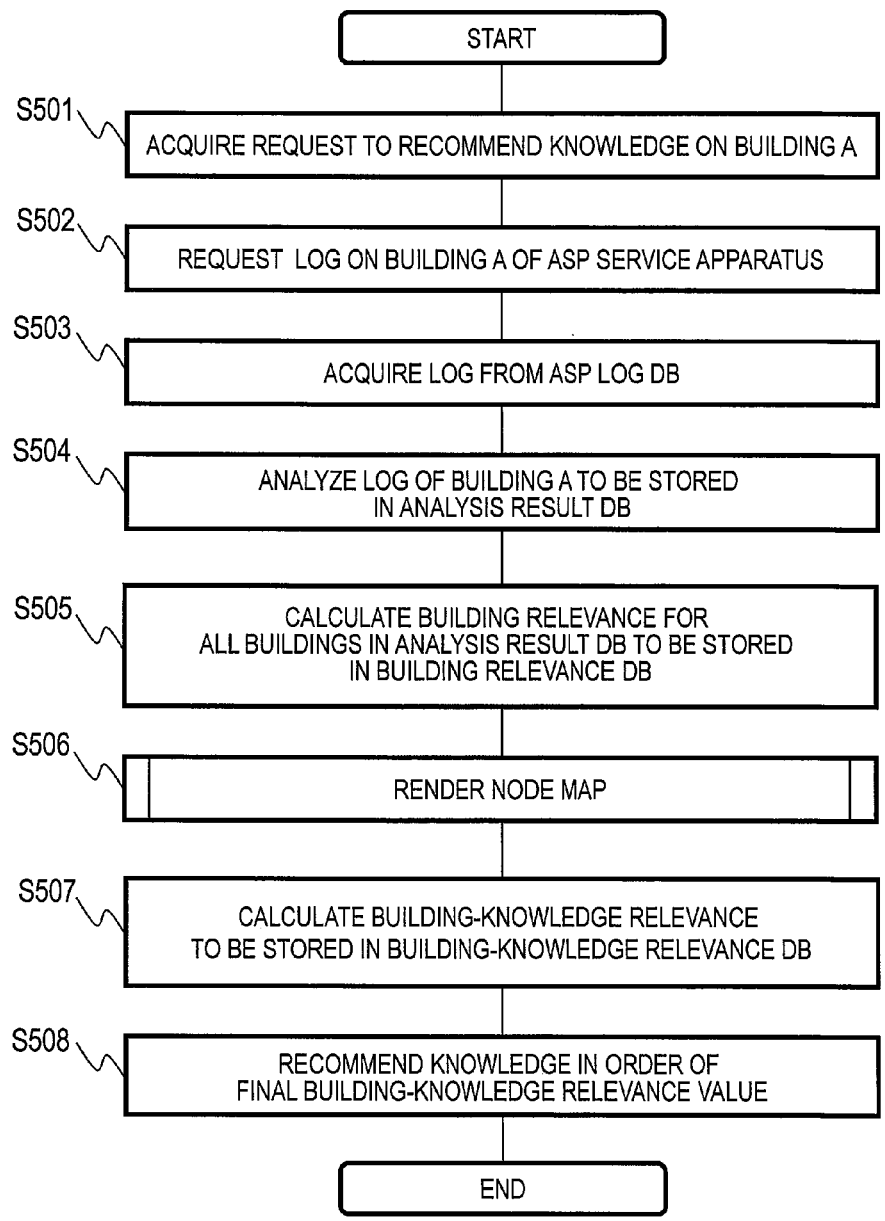
FIG. 5 is a chart illustrating an example of a flow of processing in which the knowledge recommendation service apparatus creates and transmits the recommendation knowledge to a recommendation user terminal.

FIG. 5 is a chart illustrating an example of a flow of processing in which the knowledge recommendation service apparatus 107 creates and transmits the recommendation knowledge to the recommendation user terminal 108. The request reception module 305 acquires a request to recommend knowledges on an arbitrary building, which is transmitted from the recommendation user terminal 108 (S501). In this example, the description is continuously given for a case where a request to recommend knowledges on a building A has been acquired.

The log request module 312 requests a log on the building A of the ASP service apparatus 103 via the communication module 301 (S502). The log acquisition module 313 acquires the log on the building A from the ASP log database 106 via the communication module 301 (S503).

The analysis processing module 314 analyzes the log of the building A and stores the analysis result in the analysis result database 315 (S504). Details of the analysis result of the log are described later with reference to FIG. 6.

The building relevance calculation module 316 calculates building relevance indicating relevance between the analysis result of the log of the building A, which is a subject of the analysis, and analysis results of logs of all buildings stored in the analysis result database 315, and stores the calculated building relevance in the building relevance database 307 (S505). A detailed calculation method for the building relevance is described later with reference to FIG. 7.

The node map rendering module 306 creates a node map showing the building relevance and knowledge relevance, which is described later (S506). A detailed creation method for the node map is described later with reference to FIGS. 11A and 11B.

The building-knowledge relevance calculation module 318 calculates building-knowledge relevance to be described later, and stores the calculated building-knowledge relevance in the building-knowledge relevance database 310 (S507).

The recommendation processing module 304 transmits, in a descending order of final building-knowledge relevance values on the building A stored in the building-knowledge relevance database 310, the knowledges stored in the knowledge database 309 to the recommendation user terminal 108 via the communication module 301.

FIG. 6 is a diagram illustrating an example of data structure of an analysis result database 601 (corresponding to the analysis result database 315 of FIG. 3). As described above, the analysis processing module 314 analyzes the log of an analysis subject building (log to be analyzed 401 of FIG. 4), and stores the analysis result in the analysis result database 601.

In FIG. 6, an analysis ID 602 is an ID number given to each analysis result. A subject building 603 is a name of the analysis subject building.

A period for analysis 604 is a period which is subjected to analysis. For example, a value of "2009/07" stored as the period for analysis 604 indicates that a month of July, 2009 is the period for analysis. Similarly, a value of "2009/07-2009/09" stored as the period for analysis 604 indicates that three months from July, 2009 to September, 2009 are the period for analysis.

A date of analysis 605 indicates the date on which the analysis processing module 314 executed the analysis, and a time of analysis 606 indicates the time at which the analysis was executed.

An energy consumption analysis result 607 is a result obtained by analyzing an energy consumption amount of the subject building based on the log data in the period for analysis of the subject building. The energy consumption analysis result includes a standard deviation from the same period last year 608, a standard deviation within buildings of the same scale 609, an analysis on relation to the outside air temperature 610, and a comprehensive analysis 611.

The standard deviation from the same period last year (σ) 608 is determined by calculating a ratio of the energy consumption amount from the same period last year and calculating a standard deviation from the same data (ratio of the energy consumption amount from the same period last year) on all the buildings.

The standard deviation within buildings of the same scale (σ) 609 is a standard deviation from the same data (ratio of the energy consumption amount from the same period last year) of buildings of the same scale which have total floor areas categorized into the same range.

The analysis on relation to the outside air temperature 610 is an index indicating relevance between the energy consumption amount and the outside air temperature.

The comprehensive analysis (σ) 611 is an index integrating the analysis results including the standard deviation from the same period last year 608, the standard deviation within buildings of the same scale 609, and the analysis on relation to the outside air temperature 610 by arbitrary weighting or the like.

The analysis processing module 314 determines the standard deviation from the same period last year 608, the standard deviation within buildings of the same scale 609, the analysis on relation to the outside air temperature 610, and the comprehensive analysis 611, and performs an arbitrary analysis depending on the application to determine the energy consumption analysis result 607 having an arbitrary number of analysis indices.

Figure 7:
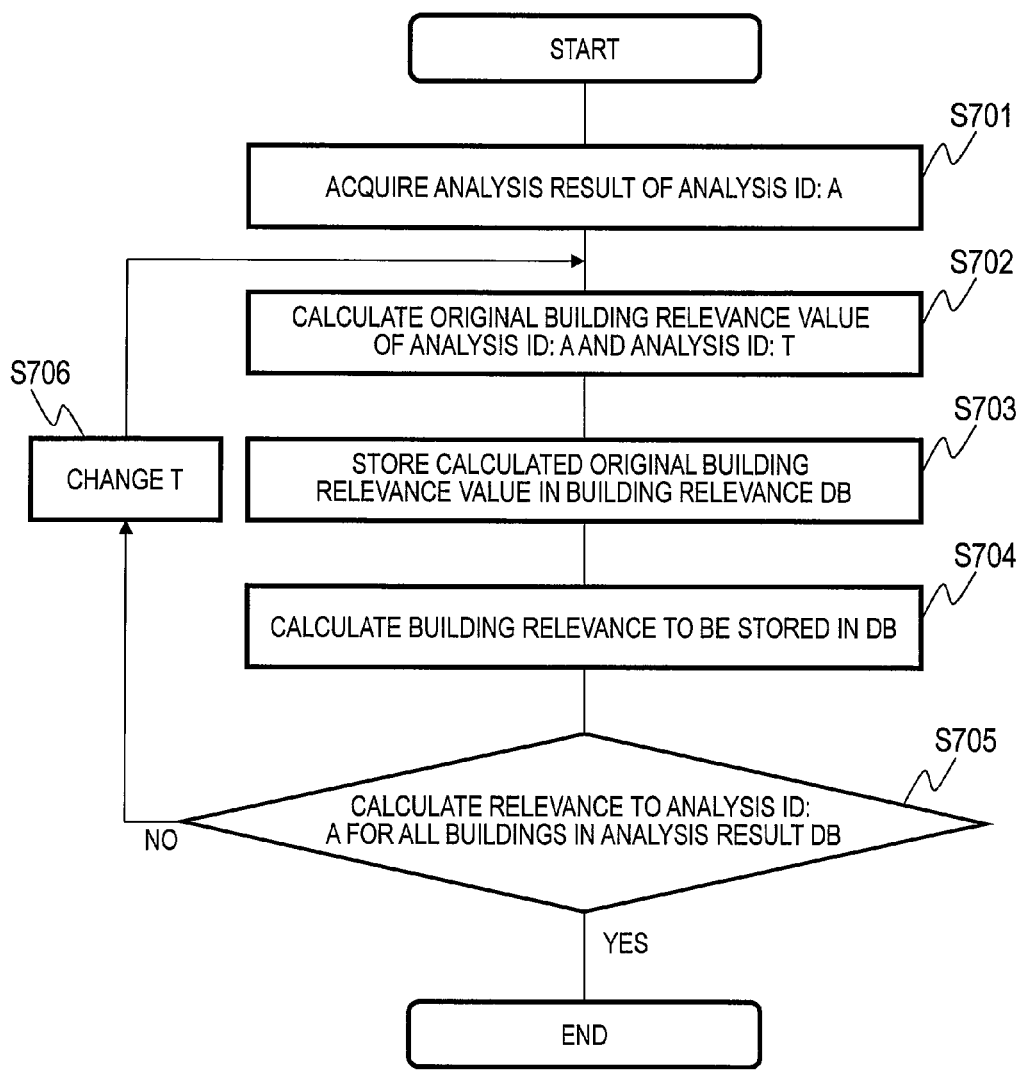
FIG. 7 is a chart illustrating an example of a flow of processing of calculating building relevance by a building relevance calculation module.

FIG. 7 is a chart illustrating an example of a flow of processing of calculating the building relevance by the building relevance calculation module 316.

The building relevance calculation module 316 first acquires the analysis result of the analysis subject ID from the analysis result database 315 (S701). In this example, the analysis subject ID is "A", and an analysis subject ID of another building for which the building relevance to the analysis subject ID "A" is calculated is "T".

Next, an original building relevance value between the analysis subject ID "A" and the analysis subject ID "T" of the other building is calculated (S702). The original building relevance value is calculated by Equation (1) below.

$$\text{original building relevance value of analysis ID "}A\text{" and analysis ID "}I\text{"} = \frac{1}{\sum_{n=1}^{N} \sqrt{(\text{analysis index } n \text{ of analysis ID "}A\text{"} - \text{analysis index } n \text{ of analysis ID "}I\text{"})}} \quad [\text{Equation 1}]$$

In Equation (1), N is a total number of analysis indices of the energy consumption analysis result 607. When the denominator on the right side becomes 0, the original building relevance value is set to a predetermined maximum value. Equation (1) is an index indicating how close analysis results of two analysis IDs are, and as the numerical value becomes larger, it is indicated that the analysis results become closer.

The building relevance calculation module 316 stores the calculated original building relevance value in the building relevance database 307 (S703).

Next, the building relevance calculation module 316 normalizes the calculated original building relevance value so that the minimum value becomes 0 and the maximum value becomes 100, and stores the building relevance determined by the normalization in the building relevance database 307 (S704).

Thereafter, it is determined whether or not the building relevance to the analysis subject ID "A" has been calculated for analysis subject IDs of all the buildings stored in the analysis result database 315 (S705). When it is determined that the building relevance to the analysis subject ID "A" has not been calculated for the analysis subject IDs of all the buildings, in order to calculate the building relevance for another analysis subject ID, T is changed (S706), and processing of S702 and subsequent steps is performed again. On the other hand, when it is determined that the building relevance to the analysis subject ID "A" has been calculated for the analysis subject IDs of all the buildings, the processing of the flow chart is ended.

Figure 8:
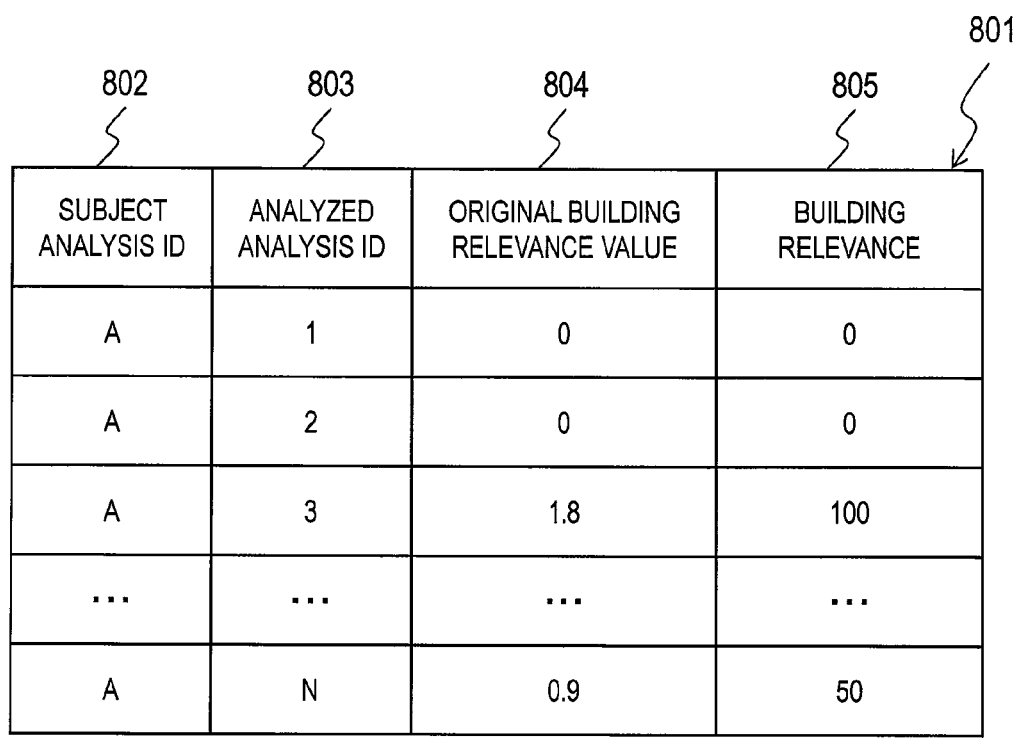
FIG. 8 is a diagram illustrating an example of data structure of a building relevance database.

FIG. 8 is a diagram illustrating an example of data structure of a building relevance database 801 (corresponding to the building relevance database 307 of FIG. 3). A subject ID 802 is an ID which is subjected to the analysis. The building relevance calculation module 316 calculates an original building relevance value 804 between the analysis subject ID 802 and an analyzed analysis ID 803 to be stored in the building relevance database 801. The building relevance calculation module 316 also normalizes the calculated original building relevance value 804, and stores building relevance 805 determined by the normalization in the building relevance database 801.

The building relevance database 801 is created for all the analysis IDs analyzed by the analysis processing module 314.

In FIG. 8, the building relevance of one subject analysis ID is stored in one building relevance database, but the building relevance of all the analysis IDs may be stored in one building relevance database.

Figure 9:
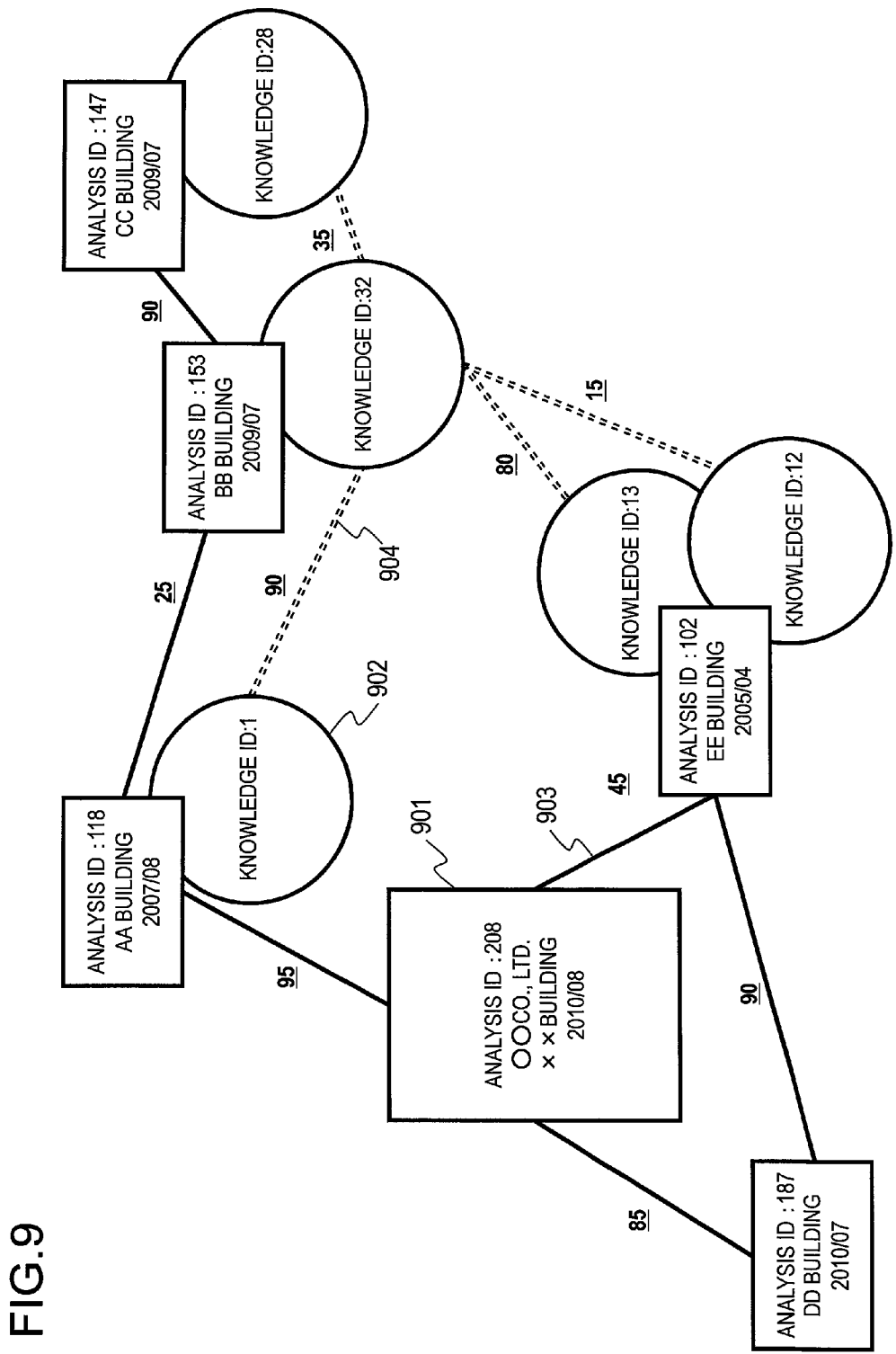
FIG. 9 is a diagram illustrating an example of a building-knowledge relevance node map created by a node map rendering module.

FIG. 9 is a diagram illustrating an example of a building-knowledge relevance node map created by the node map rendering module 306. The building-knowledge relevance node map shows visualized relationships among analysis IDs and knowledge IDs to the user. In FIG. 9, the analysis ID and its content in a period of a building are illustrated by the rectangle as an analysis ID node 901. In the node map, a plurality of analysis ID nodes are illustrated, and the analysis ID node illustrated by the largest rectangle is the ID node which is the analysis subject. In addition, a knowledge corresponding to the analysis ID is illustrated by the circle as a knowledge ID node 902.

In FIG. 9, a building relevance line 903 illustrated by the solid line is a line (link) for connecting an analysis ID node and an analysis ID node, and has a value of the building relevance between the connected analysis ID nodes. For example, the building relevance between an analysis ID: 208 and an analysis ID: 102 is 45.

In FIG. 9, a knowledge relevance line 904 illustrated by the dashed line is a line (link) for connecting a knowledge ID node and a knowledge ID node, and has a value of the knowledge relevance between the connected knowledge ID nodes. The knowledge relevance is described later.

A knowledge ID associated with an analysis ID is connected to another analysis ID node or knowledge ID node via a node by at least one path. The building-knowledge relevance calculation module 318 calculates, depending on the number of paths between an analysis ID and a knowledge ID, the final building-knowledge relevance value by Equation (2) below.

final building-knowledge relevance value=MAX (building-knowledge relevance of path 1, building-knowledge relevance of path 2, . . . building-knowledge relevance of path $m$) [Equation 2]

Equation (2) is an example of an equation for calculating the final building-knowledge relevance value. There is at least one path that connects an analysis ID node and a knowledge ID node. When there are m paths, there are also m building-knowledge relevance values to be calculated by the method to be described later. In Equation (2), the maximum value of the m building-knowledge relevance values is set as the final building-knowledge relevance value.

Figure 10:
FIG. 10 is a diagram illustrating an example of data structure of a building-knowledge relevance database.

FIG. 10 is a diagram illustrating an example of data structure of a building-knowledge relevance database 2501 (corresponding to the building-knowledge relevance database 310 of FIG. 3). The building-knowledge relevance database 2501 includes a subject analysis ID 2502, a knowledge ID 2503, and a final building-knowledge relevance value 2504. The analysis subject ID 2502 corresponds to the analysis ID 602 of the analysis result database 601 illustrated in FIG. 6. The knowledge ID 2503 corresponds to a knowledge ID 1202 of the knowledge database illustrated in FIG. 13, which is described later.

It should be noted that the building-knowledge relevance database 2501 illustrated in FIG. 10 includes the final building-knowledge relevance value 2505 with a rating result reflected, which is described in the second embodiment to be described later.

Figure 11A:
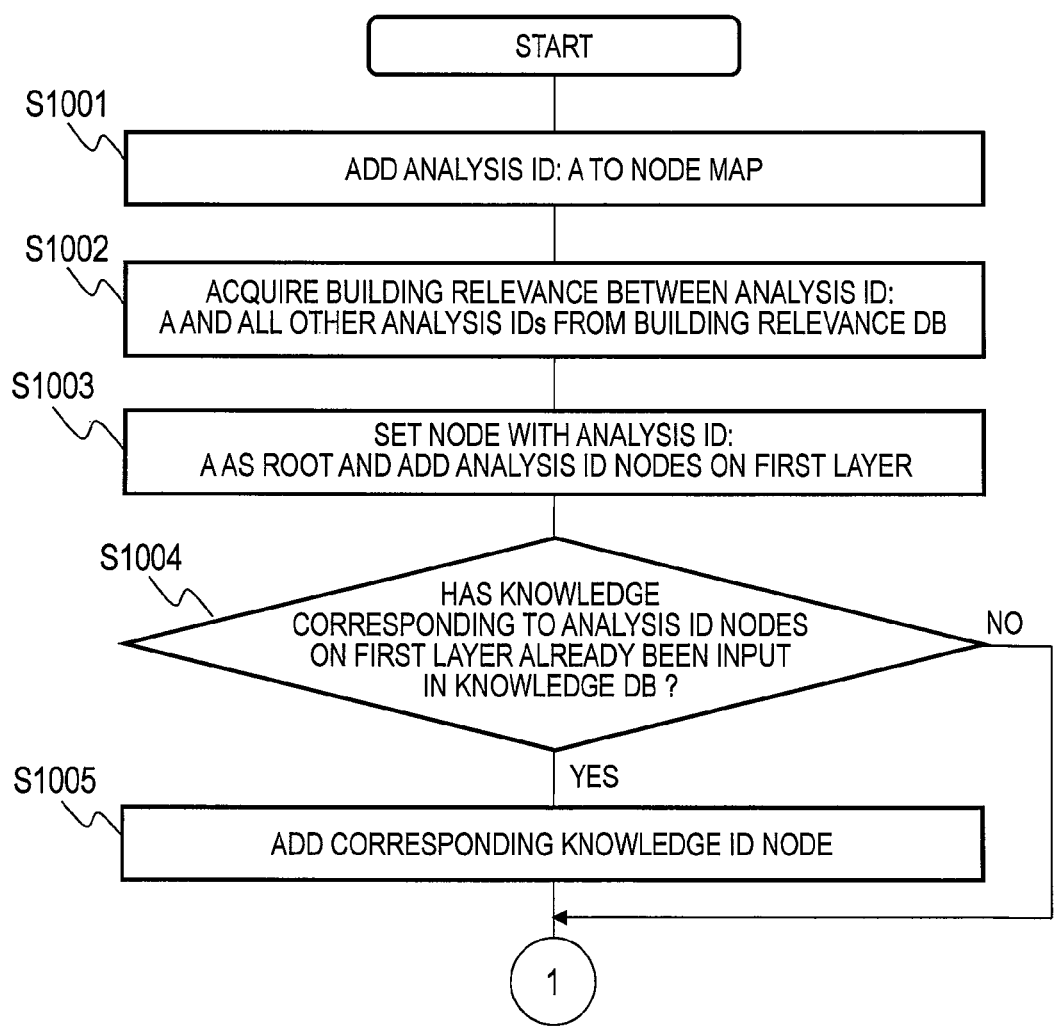
FIG. 11A is a chart illustrating an example of a processing flow of node map rendering performed by the node map rendering module.
Figure 11B:
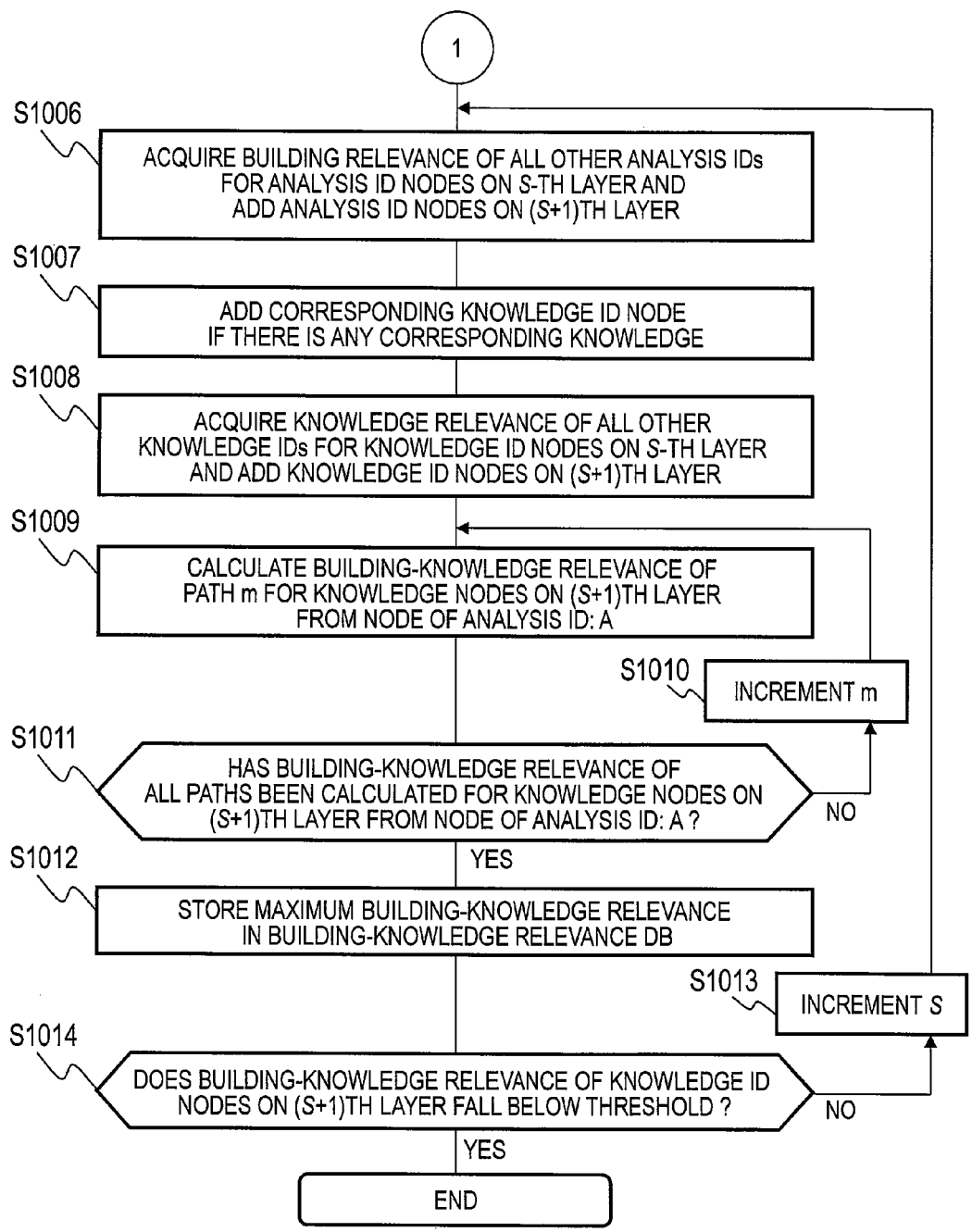
FIG. 11B is a chart illustrating an example of a processing flow subsequent to FIG. 11A.

FIG. 11A is a chart illustrating an example of a processing flow of node map rendering performed by the node map rendering module 306. FIG. 11B is a chart illustrating an example of a processing flow subsequent to FIG. 11A. First of all, an analysis ID node having an analysis ID "A" is added to the node map (S1001). Then, the building relevance between the analysis ID "A" and all the other analysis IDs is acquired from the building relevance database 307 (S1002).

Next, the analysis ID "A" is set as a root (origin), and analysis ID nodes on the first layer are added (S1003). The analysis ID nodes on the first layer are analysis IDs having the building relevance of a certain threshold or more. It should be noted, however, that all the analysis IDs may be set as the analysis ID nodes on the first layer.

Then, it is determined whether or not knowledges corresponding to the analysis ID nodes on the first layer are stored in the knowledge database 308 (S1004), and when it is determined that the knowledges are stored, the corresponding knowledge IDs are acquired from the knowledge database 308 to be added to the node map (S1005). On the other hand, when it is determined that the corresponding knowledges are not stored in the knowledge database 308, the processing proceeds to S1006.

Next, for analysis ID nodes on the S-th layer (with the initial value of S=1), which are terminal nodes at this point, the building relevance of another building is acquired, analysis ID nodes on the (S+1)th layer are added to the node map (S1006). The analysis ID nodes to be added are analysis IDs having the building relevance of a certain threshold or more. When knowledges corresponding to the added analysis ID nodes are stored in the knowledge database 308, the corresponding knowledge IDs are acquired from the knowledge database 308, and the acquired knowledge IDs are added to the node map (S1007).

For knowledge ID nodes on the S-th layer, the knowledge relevance of all the other knowledge IDs is acquired, and knowledge ID nodes on the (S+1)th layer are added (S1008). The knowledge ID nodes to be added are knowledge IDs having the knowledge relevance of a certain threshold or more. The certain threshold may be the same value as the threshold for comparison with the building relevance, or may be a different value. Alternatively, all the knowledge IDs may be added.

Next, the building-knowledge relevance of a path m (with the initial value of m=1) connecting from the node of the analysis ID "A", which is a root node, to the knowledge nodes on the (S+1)th layer (S1009).

Equation (3) below is an example of an equation for calculating the building-knowledge relevance. The building-knowledge relevance is an index indicating a degree of relevance between the analysis ID "A", which is an analysis result in a period of a building, and a knowledge ID "N". As the value becomes larger, it is indicated that the relevance becomes higher.

building-knowledge relevance of analysis ID "A" and knowledge ID "N" = [Equation 3]

$$\sum_{n=1}^{n=N} \left\{ (\text{relevance to adjacent node}) \times \frac{1}{\begin{array}{c}\text{number of layers}\\\text{from node of}\\\text{analysis ID "}A\text{"}\\\text{to node knowledge}\\\text{ID "}n\text{"}\end{array}} \right\}$$

In Equation (3), the "relevance to adjacent node" refers to the building relevance between adjacent analysis ID nodes or the knowledge relevance between adjacent knowledge ID nodes. For example, in the node map illustrated in FIG. 9, the number of paths between an analysis ID node of an analysis ID "208" and a knowledge ID node of a knowledge ID "32" is 2. When a path through the building relevance between an analysis ID node of an analysis ID "118" and an analysis ID node of an analysis ID "153" is Path 1 and a path through the knowledge relevance between a knowledge ID node of a knowledge ID "1" and the knowledge ID node of the knowledge ID "32" is Path 2, the building-knowledge relevance of Path 1 is 107.5 (=95*1/1+25*1/2) and the building-knowledge relevance of Path 2 is 140.0 (=95*1/1+90*1/2).

For the knowledge nodes on the (S+1)th layer from the node of the analysis ID "A", it is determined whether or not the building-knowledge relevance of all the paths has been calculated (S1011). When it is determined that the building-knowledge relevance of all the paths has not been calculated, the parameter m is incremented (S1010) and the processing of S1009 is performed again. On the other hand, when it is determined that the building-knowledge relevance of all the paths has been calculated, the maximum building-knowledge relevance of the building-knowledge relevance values of Path 1 to Path m is stored as the final building-knowledge relevance value in the building-knowledge relevance database 310 (S1012).

Then, it is determined whether or not the building-knowledge relevance of the knowledge ID nodes on the (S+1)th layer falls below a certain threshold (S1014). The threshold may be the same value as the threshold for comparison with the building relevance or the threshold for comparison with the knowledge relevance described above, or may be a different value. When it is determined that the building-knowledge relevance of the knowledge ID nodes on the (S+1)th layer does not fall below the predetermined threshold, the parameter S is incremented (S1013) and the processing of S1006 is performed again. On the other hand, when it is determined that the building-knowledge relevance of the knowledge ID nodes on the (S+1)th layer falls below the predetermined threshold, the processing of the flow chart is ended.

Figure 12:
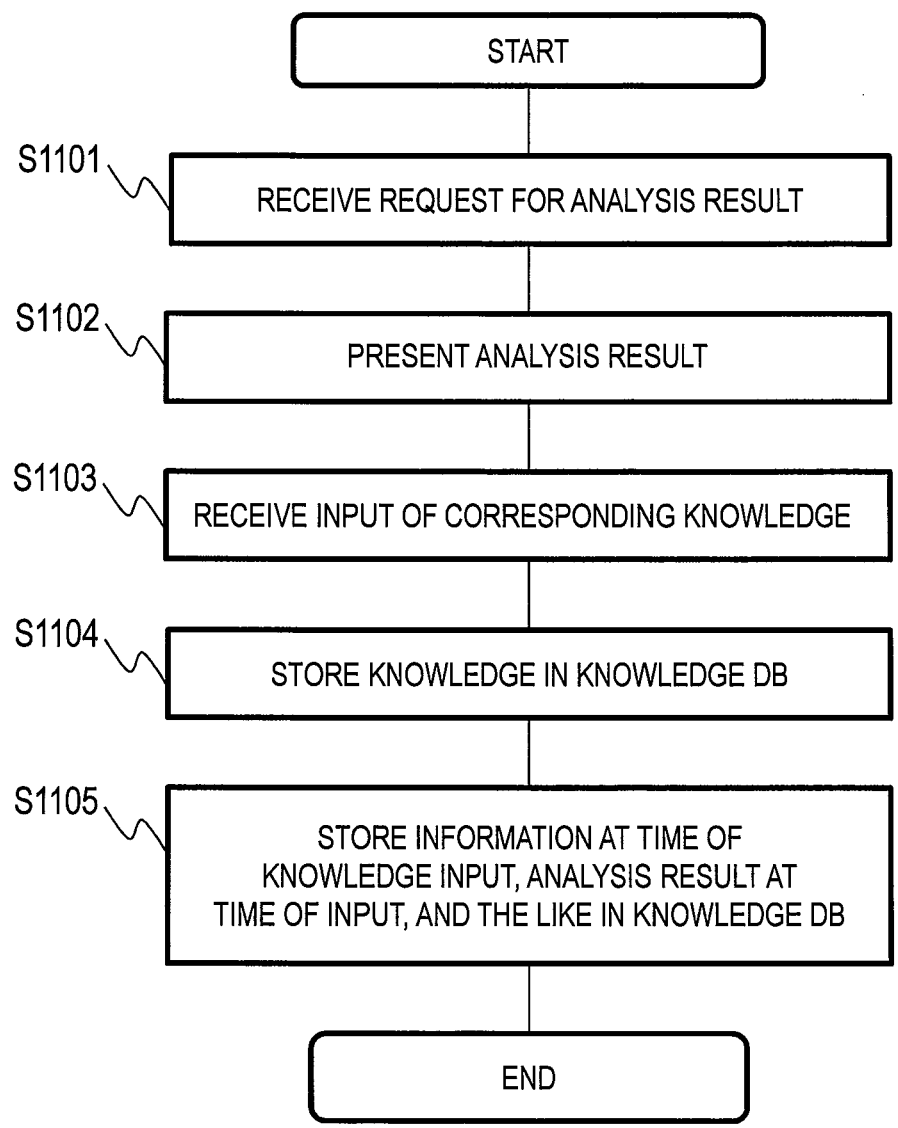
FIG. 12 is a chart illustrating an example of a flow of processing of inputting a new knowledge.

FIG. 12 is a chart illustrating an example of a flow of processing of inputting a new knowledge. The request reception module 305 receives a request for an analysis result in an arbitrary period of an arbitrary building, which is input by the recommendation user through the recommendation user terminal 108 (S1101). The analysis result processing module 321 processes the analysis result stored in the analysis result database 315, and transmits the analysis result to the recommendation user terminal 108 through the communication module 301 and the network (S1102).

The user sees the analysis result presented on the recommendation user terminal 108 and inputs a corresponding knowledge on the recommendation user terminal 108 to be transmitted to the knowledge recommendation service apparatus 107. The knowledge reception module 303 receives the input of the knowledge through the network and the communication module 301 (S1103). The knowledge received by the knowledge reception module 303 is stored in the knowledge database 308 (S1104). Information at the time of knowledge input and information on the analysis result and the like at the time of knowledge input are also stored in the knowledge database 308 (S1105). The information at the time of knowledge input and the information on the analysis result and the like at the time of knowledge input are described later with reference to FIG. 13.

Figure 13:
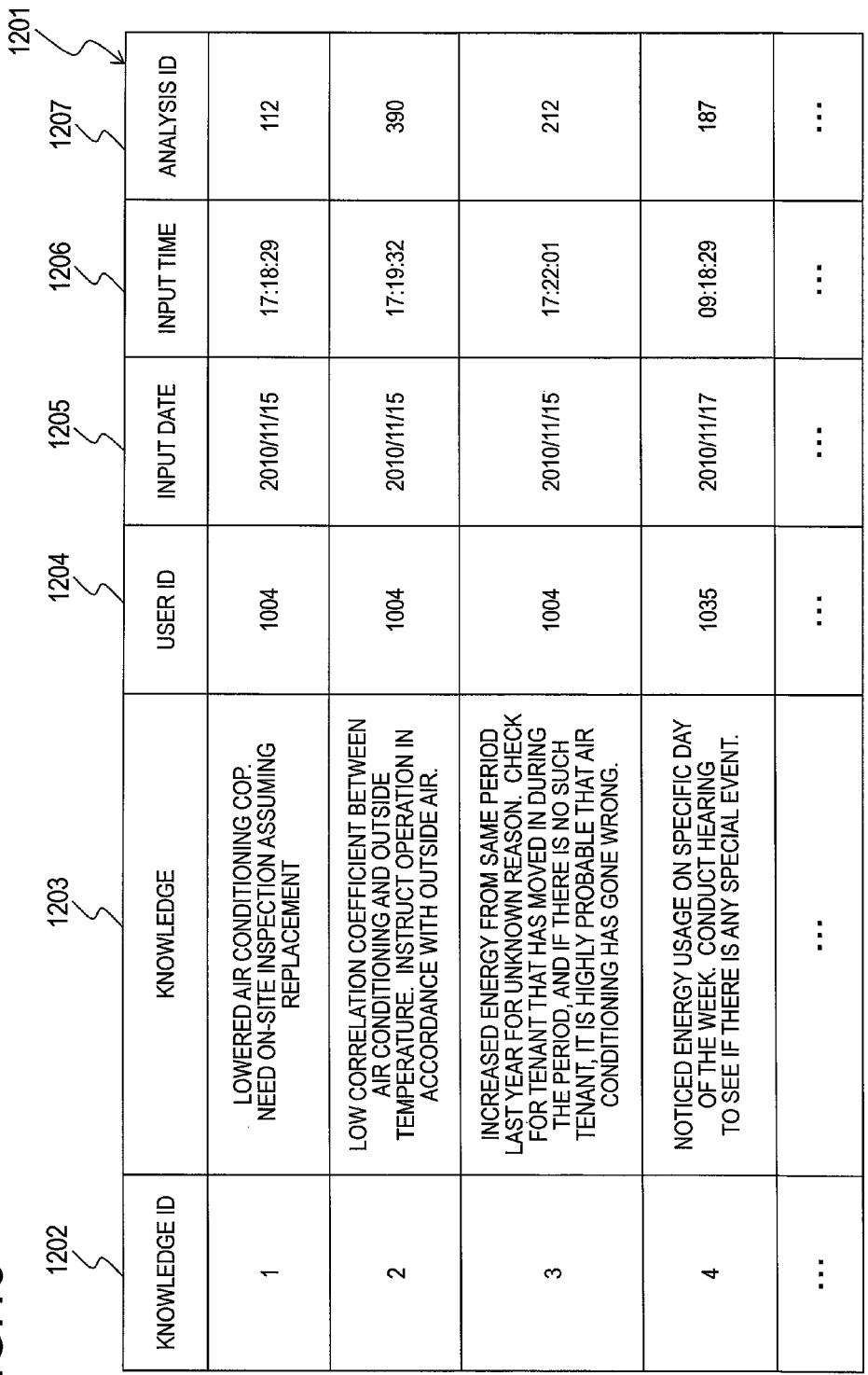
FIG. 13 is a diagram illustrating an example of data structure of a knowledge database.

FIG. 13 is a diagram illustrating an example of data structure of a knowledge database 1201 (corresponding to the knowledge database 308 of FIG. 3). In the database 1201 illustrated in FIG. 13, the knowledge ID 1202 is an ID given to each knowledge. A knowledge 1203 is the knowledge input from the recommendation user terminal 108. For example, in the example illustrated in FIG. 13, as a knowledge of a knowledge ID: 2, "Low correlation coefficient between air conditioning and the outside air temperature. Instruct operation in accordance with the outside air" is input.

A user ID 1204 is an ID for identifying the recommendation user who has input the knowledge. The acquisition processing for the user ID 1204 is described later with reference to a flow chart illustrated in FIG. 17.

An input date 1205 is a date on which the knowledge input by the recommendation user is acquired, and an input time 1206 is a time at which the knowledge input by the recommendation user is acquired. The date and the time are acquired from a date/time acquisition device (not shown).

An analysis ID 1207 is an ID for identifying an analysis result presented to the recommendation user.

Figure 14:
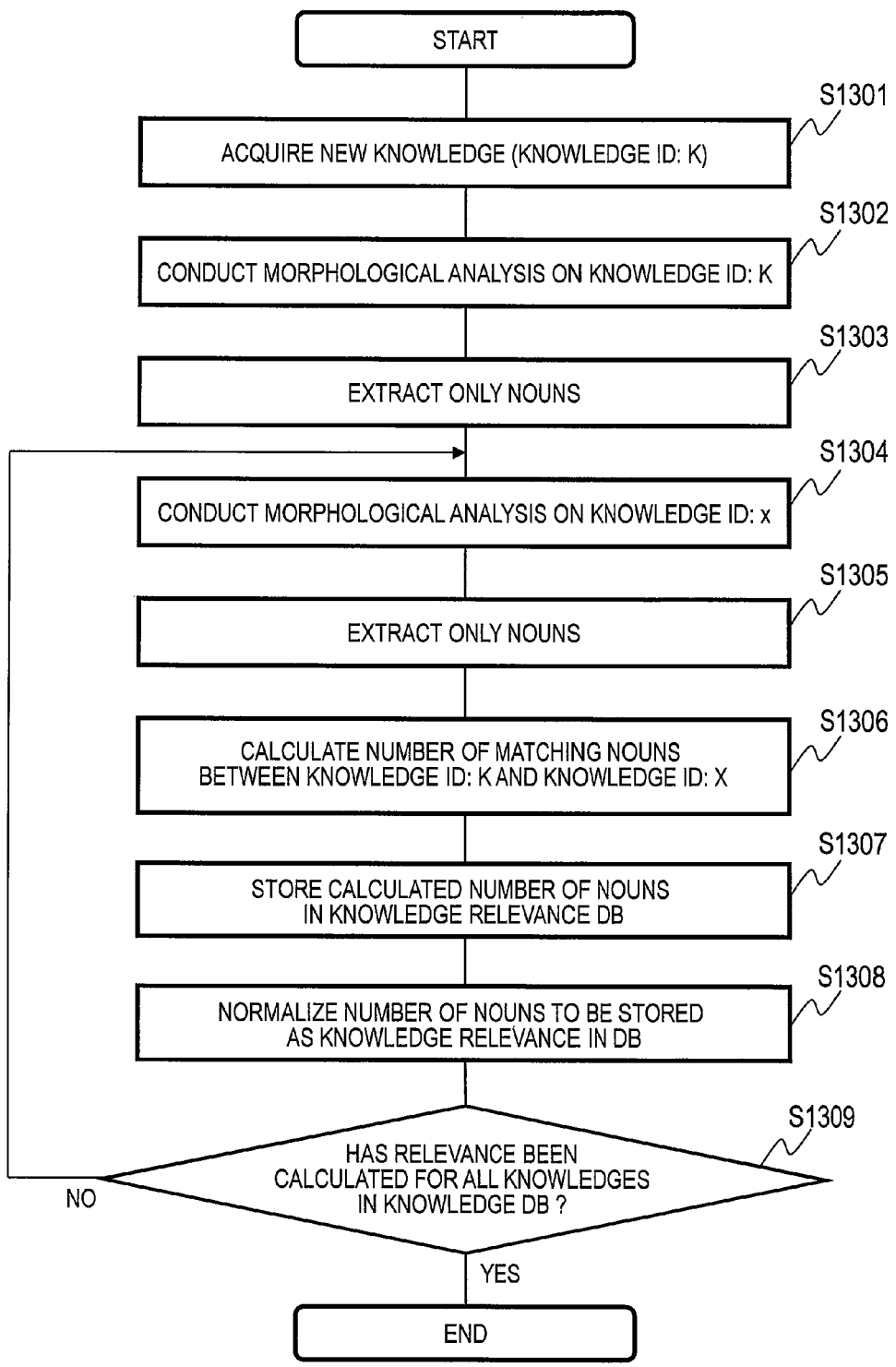
FIG. 14 is a chart illustrating an example of a flow of processing for calculating knowledge relevance.

FIG. 14 is a chart illustrating an example of a flow of processing for calculating the knowledge relevance. The knowledge relevance is an index indicating how relevant a knowledge of a knowledge ID and a knowledge of another knowledge ID are, and is calculated by the knowledge relevance calculation module 317. As the value of the knowledge relevance becomes larger, it is indicated that the relevance becomes higher.

Now, for a newly acquired knowledge ID "K", the knowledge relevance to another knowledge ID is calculated. First of all, the knowledge reception module 303 acquires a new knowledge for the knowledge ID "K" (S1301). The acquired new knowledge is stored in the knowledge database 308.

Next, the knowledge relevance calculation module 317 conducts a morphological analysis on the acquired knowledge of the knowledge ID "K" (S1302) to extract only nouns (S1303). Then, the knowledge relevance calculation module 317 conducts the morphological analysis on a knowledge of another knowledge ID "X" (S 1304) to extract only nouns (S 1305).

Then, of the extracted nouns of the knowledge ID "K" and the extracted nouns of the knowledge ID "X", the number of matching nouns is calculated (S1306). The calculated number of nouns is stored in the knowledge relevance database 309 (S1307). The calculated number of nouns is also normalized to be stored as the knowledge relevance in the knowledge relevance database 309 (S1308).

Thereafter, for all knowledges stored in the knowledge database 308, it is determined whether or not the knowledge relevance to the knowledge of the knowledge ID "K" has been calculated (S1309). When it is determined that the knowledge relevance has not been calculated for all the knowledges stored in the knowledge database 308, the processing returns to S1304, in which the knowledge relevance is calculated for another knowledge. On the other hand, when it is determined that the knowledge relevance has been calculated for all the knowledges stored in the knowledge database 308, the processing of the flow chart is ended.

FIG. 15 is a diagram illustrating an example of data structure of a knowledge relevance database 1401 (corresponding to the knowledge relevance database 309 of FIG. 3). FIG. 15 illustrates an example of knowledge relevance data 1401 of the subject knowledge ID "K".

In FIG. 15, a subject knowledge ID 1402 is a knowledge ID as a subject. An input knowledge ID 1403 is another knowledge ID stored in the knowledge database 308. A number of matching nouns 1404 is the number of matching nouns between a knowledge of the subject knowledge ID 1402 and a knowledge of the input knowledge ID 1403. Knowledge relevance 1405 is a value obtained by normalizing the number of matching nouns 1404 so that the minimum value becomes 0 and the maximum value becomes 100.

The knowledge relevance database 1401 is created for every knowledge ID stored in the knowledge database 308. In FIG. 15, the knowledge relevance to one subject knowledge ID is stored in one knowledge relevance database, but the knowledge relevance to all subject knowledge IDs may be stored in one knowledge relevance database.

FIG. 16A is a diagram illustrating an example of a user interface for the knowledge recommendation and input. A user interface 1501 for the knowledge recommendation and input is a screen to be presented on the recommendation user terminal 108 after the recommendation user has requested an analysis result of a period of a building and a knowledge recommendation. The user interface 1501 includes an analysis result area 1502, a knowledge recommendation area 1503, a knowledge input area 1504, and a screen switching area 1505.

In the analysis result area 1502, a subject building name 1506 for which the recommendation user has requested the analysis result, a period for analysis 1507, an analysis result table 1508, and an analysis result graph 1509 are displayed.

FIG. 16B is a diagram illustrating an example of detailed contents of the analysis result table 1508. The analysis result table 1508 is, for example, data on the analysis subject building stored in the analysis result database 315. The analysis result graph 1509 is, for example, the data stored in the analysis result database 315 and visualized.

In the knowledge recommendation area 1503, a knowledge recommendation table 1510 and a button 1511 for moving to a node map display screen are displayed. FIG. 16C is a diagram illustrating an example of detailed contents of the knowledge recommendation table 1510.

In this embodiment, a subject user of the knowledge recommendation is a sales person of a building management operator. Therefore, to the sales person, the knowledge recommendation table 1510 in which the knowledges to be recommended are written is presented. In the knowledge recommendation table 1510, corresponding to the analysis ID displayed in the analysis result area 1502, highly relevant knowledges are presented in order of relevance. The order of relevance is determined in order from the knowledge IDs having the largest final building-knowledge relevance values. In addition, the subject buildings at the time of input when the knowledge IDs are input and the periods for analysis at the time of input are acquired from the knowledge database 308 to be presented in the knowledge recommendation table 1510.

For inputting a new knowledge to the analysis ID displayed in the analysis result area 1502, the recommendation user inputs the knowledge in a knowledge input text box 1512 of the knowledge input area 1504 and presses an input button 1513. This transmits the input knowledge to the knowledge recommendation service apparatus 107 via the network.

Figure 17:
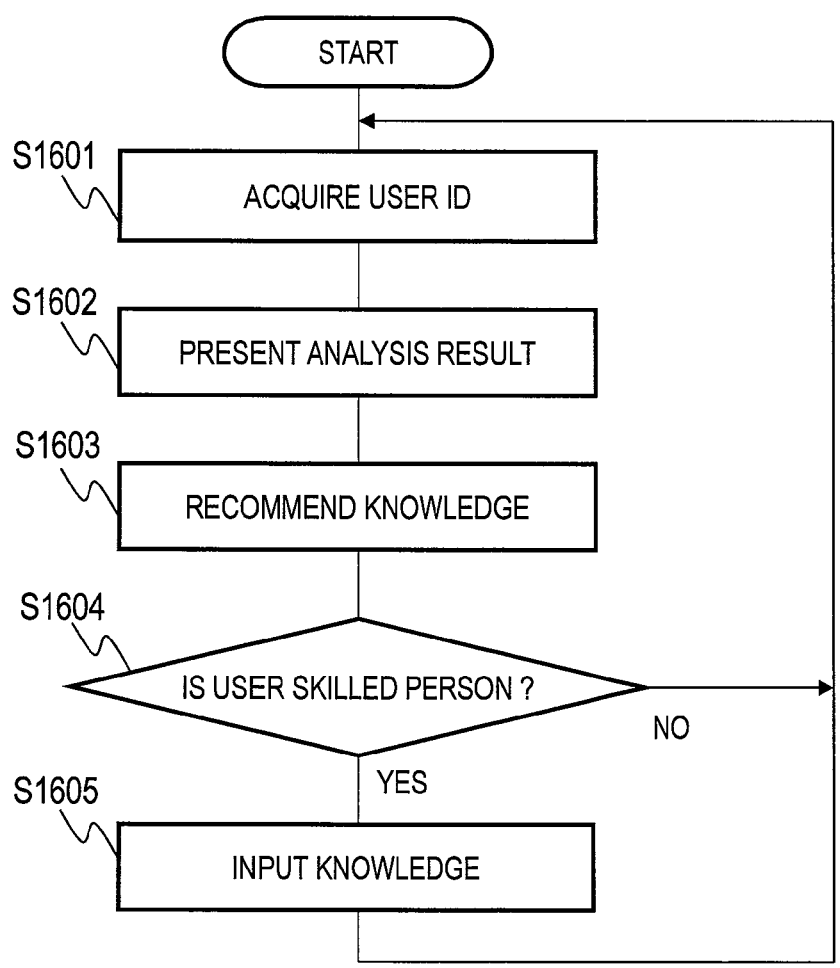
FIG. 17 is a chart illustrating an example of a processing flow of user determination.

FIG. 17 is a chart illustrating an example of a processing flow of user determination. Not all users have the knowledge for the analysis result, but it is often the case that a skilled user such as a particular skilled sales person has the knowledge. Therefore, in this embodiment, only a skilled user can input the knowledge.

When logging in the application of this embodiment, the user needs to input a user ID to a login user interface (not shown). The user determination module 302 acquires the input user ID (S 1601).

Next, the analysis result processing module 321 acquires from the analysis result database 315 the analysis result of the building requested by the recommendation user, and based on the acquired analysis result, performs processing such as creating the analysis result graph. Then, the analysis result processing module 321 transmits the analysis result (analysis result table 1508 and analysis result graph 1509 of FIG. 16) to the recommendation user terminal 108 via the communication module 301 and the network (S1602). Also, the recommendation processing module 304 transmits the knowledges (knowledge recommendation table 1510 of FIG. 16) corresponding to the analysis result (S1603).

Then, the user determination module 302 determines, based on the user ID input by the user, whether or not the user is a skilled person (S1604). For example, the user determination module 302 includes a user database in which the user ID of the user and information on whether or not the user is a skilled person are stored. The user determination module 302 refers to the information in the user database to determine whether or not the user who has logged in is a skilled person. When it is determined that the user is a skilled person, the knowledge reception module 303 activates the knowledge input area 1504 to receive an input of a knowledge (S1605). On the other hand, when it is determined that the user is not a skilled person, the knowledge reception module 303 prohibits the input of the knowledge to the knowledge input area 1504.

Figure 18:
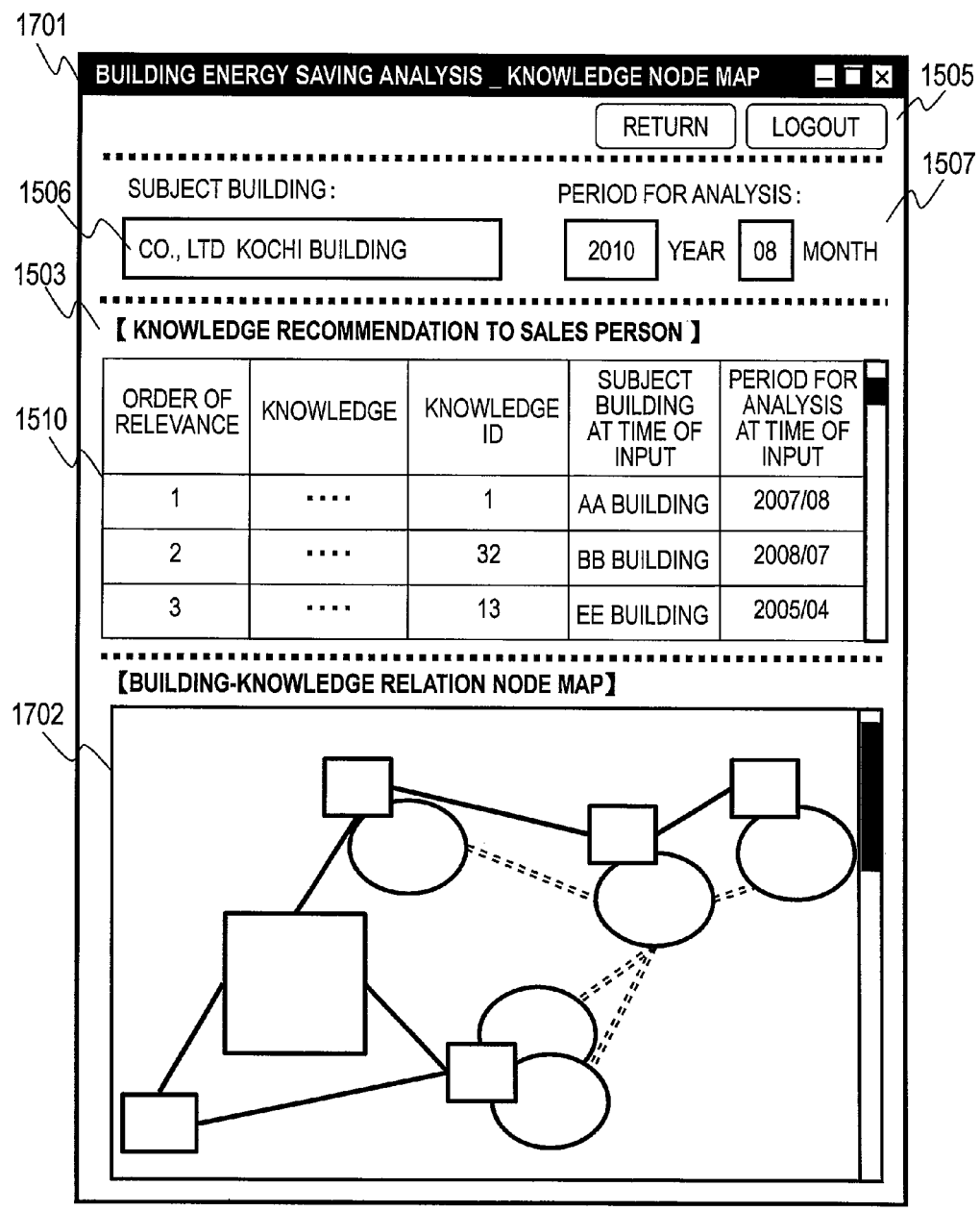
FIG. 18 is a diagram illustrating an example of a user interface for presenting knowledges and a node map.

FIG. 18 is a diagram illustrating an example of a user interface for presenting knowledges and a node map. A user interface 1701 for presenting the knowledges and the node map is displayed when the button 1511 for moving to a node map display screen in the user interface 1501 for the knowledge recommendation and input illustrated in FIG. 16 is pressed. In the user interface 1701, the screen switching area 1505, the subject building name 1506 for which the analysis result is requested, the period for analysis 1507, and the knowledge recommendation table 1510 are displayed. A node map 1702 corresponding to the analysis ID of the analysis result and rendered by the processing flow of FIG. 11 is also displayed.

It should be noted that the above description has been made of the example in which the computer system according to this invention is applied to the knowledge recommendation service for the building management business. However, the computer system according to this invention is applicable not only to the building management business but also to other fields of services or businesses such as a financial business and e-commerce.

Figure 19:
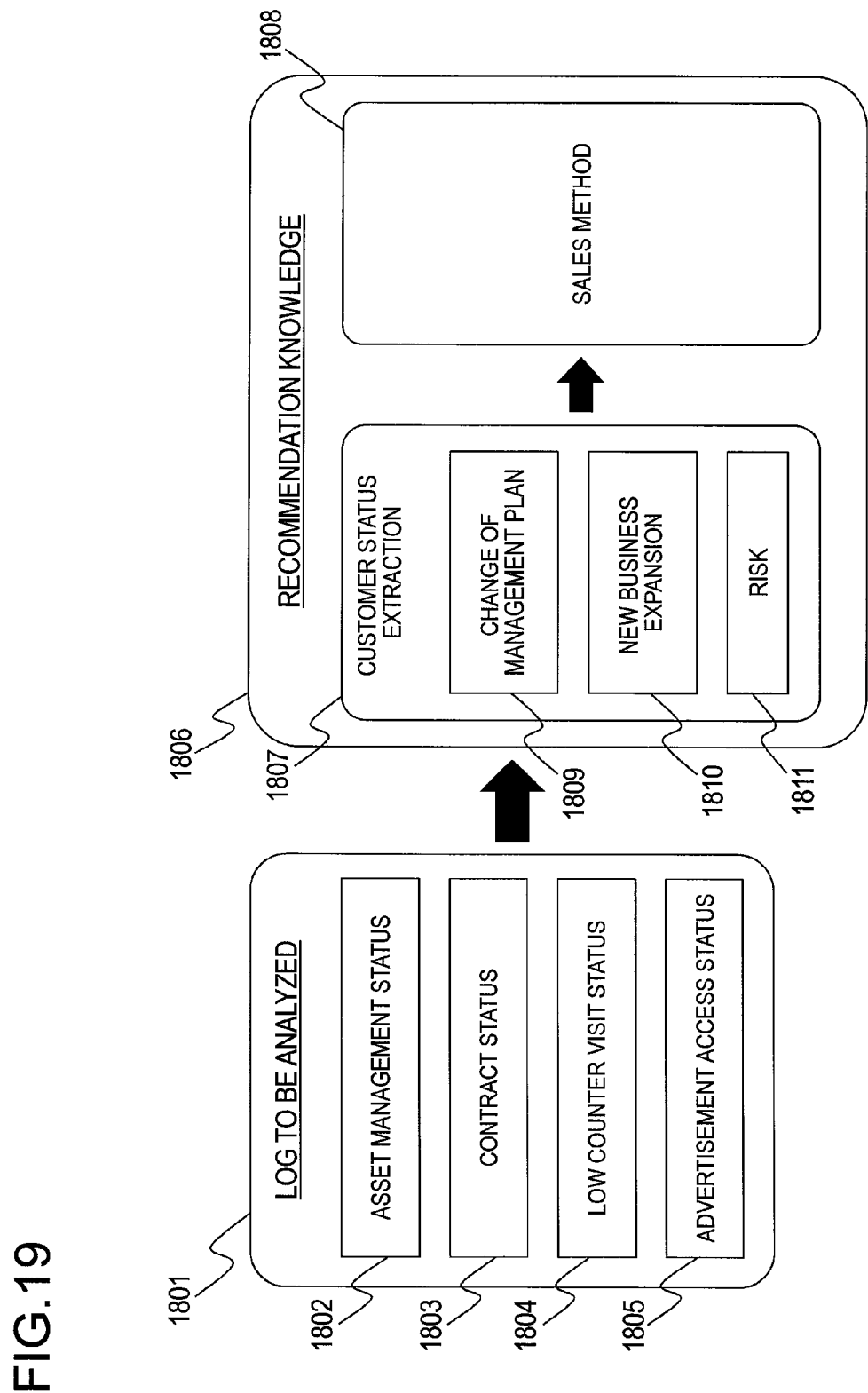
FIG. 19 is a diagram illustrating an example of a log to be analyzed and a recommendation knowledge when a computer system according to this invention is applied to a financial business.

FIG. 19 is a diagram illustrating an example of a log to be analyzed and a recommendation knowledge when the computer system according to this invention is applied to a financial business. A log to be analyzed 1801 includes information such as an asset management status 1802 of a customer, a contract status 1803, a low counter visit status 1804 indicating a counter visit status of the customer, and an advertisement access status 1805.

A recommendation knowledge 1806 includes information on customer status extraction 1807 obtained as a result of an analysis and information on a sales method 1808 corresponding to the extracted customer information. The customer status extraction 1807 includes information such as a change of management plan 1809, new business expansion 1810, and a risk 1811. The risk 1811 is information such as a business downturn, a risk of bankruptcy, and a condition for a black list of the customer. The information on the sales method 1808 includes information such as proposal/termination of financing, a change in interest rate, and over-the-counter sales of insurance.

In this case also, the relevance between logs to be analyzed and the relevance between recommendation knowledges are calculated, and the relevance between each of the logs to be analyzed and each of the recommendation knowledges is calculated. Then, in a descending order of the relevance values between the logs to be analyzed and the recommendation knowledges, the recommendation knowledges relevant to the logs to be analyzed are presented.

As described above, according to the first embodiment, the computer system includes a first database for holding relevance between physical amounts measured under conditions that are different in at least one of time and place, and a second database for holding relevance between pieces of information corresponding to the measured physical amounts and including texts. In the computer system, a processor calculates, based on the relevance between the physical amounts held in the first database and the relevance between the pieces of information held in the second database, relevance between each of the measured physical amounts and each of the pieces of information corresponding to the physical amounts to be held in a third database. When the physical amounts are input, the processor refers to the third database to present information highly relevant to the input physical amounts. In this manner, high-quality information considering not only the relevance between the physical amounts or the relevance between the pieces of information but also the relevance between each of the physical amounts and each of the pieces of information may be presented to a user.

Moreover, the relevance between the physical amounts and the relevance between the pieces of information are filtered by a predetermined threshold, and a link between the physical amounts and a link between the pieces of information which have relevance higher than the predetermined threshold are combined to calculate the relevance between each of the physical amounts and each of the pieces of information. In this manner, as the relevance between each of the physical amounts and each of the pieces of information, high-quality relevance may be calculated.

In particular, in the first embodiment, the input physical amounts are analyzed and an analysis result is held in the analysis result database, and for the analysis result held in the analysis result database, the relevance between the physical amounts is calculated. Then, of a link between the physical amounts and a link between the pieces of information corresponding to the link between the physical amounts, a link having a higher relevance value is used to calculate the relevance between each of the measured physical amounts and each of the pieces of information corresponding to the physical amounts. In this manner, the relevance between each of the physical amounts and each of the pieces of information may be appropriately calculated.

Further, data for graphically displaying the relevance between the physical amounts and the relevance between the pieces of information is generated, and hence the relevance between the physical amounts and the relevance between the pieces of information may be presented as a figure to the user.

Moreover, nouns are extracted from texts included in the pieces of information corresponding to the physical amounts, and depending on the number of extracted nouns that overlap, the relevance between the pieces of information is calculated, with the result that the relevance between the pieces of information may be calculated accurately.

Moreover, of a link between the physical amounts and a link between the pieces of information, the link having a higher relevance value is extracted, and based on relevance of the extracted link and a distance of the extracted link from each of the physical amounts, the relevance between each of the physical amounts and each of the pieces of information is calculated. In this manner, the relevance between each of the physical amounts and each of the pieces of information may be appropriately calculated.

Further, data for displaying the measured physical amounts and the knowledges corresponding to the physical amounts in one screen is generated, and hence the physical amounts and the knowledges corresponding to the physical amounts may be presented in one screen to the user.

Second Embodiment

Next, the second embodiment of this invention is described with reference to FIGS. 20 to 24.

In the second embodiment, a knowledge recommendation system in which presented knowledges is rated and rating data is reflected on the relevance and in rendering the node map is described. It should be noted that descriptions of parts having the same reference symbols and functions as the parts illustrated in the drawings that are already described in the first embodiment are partly omitted.

Figure 20:
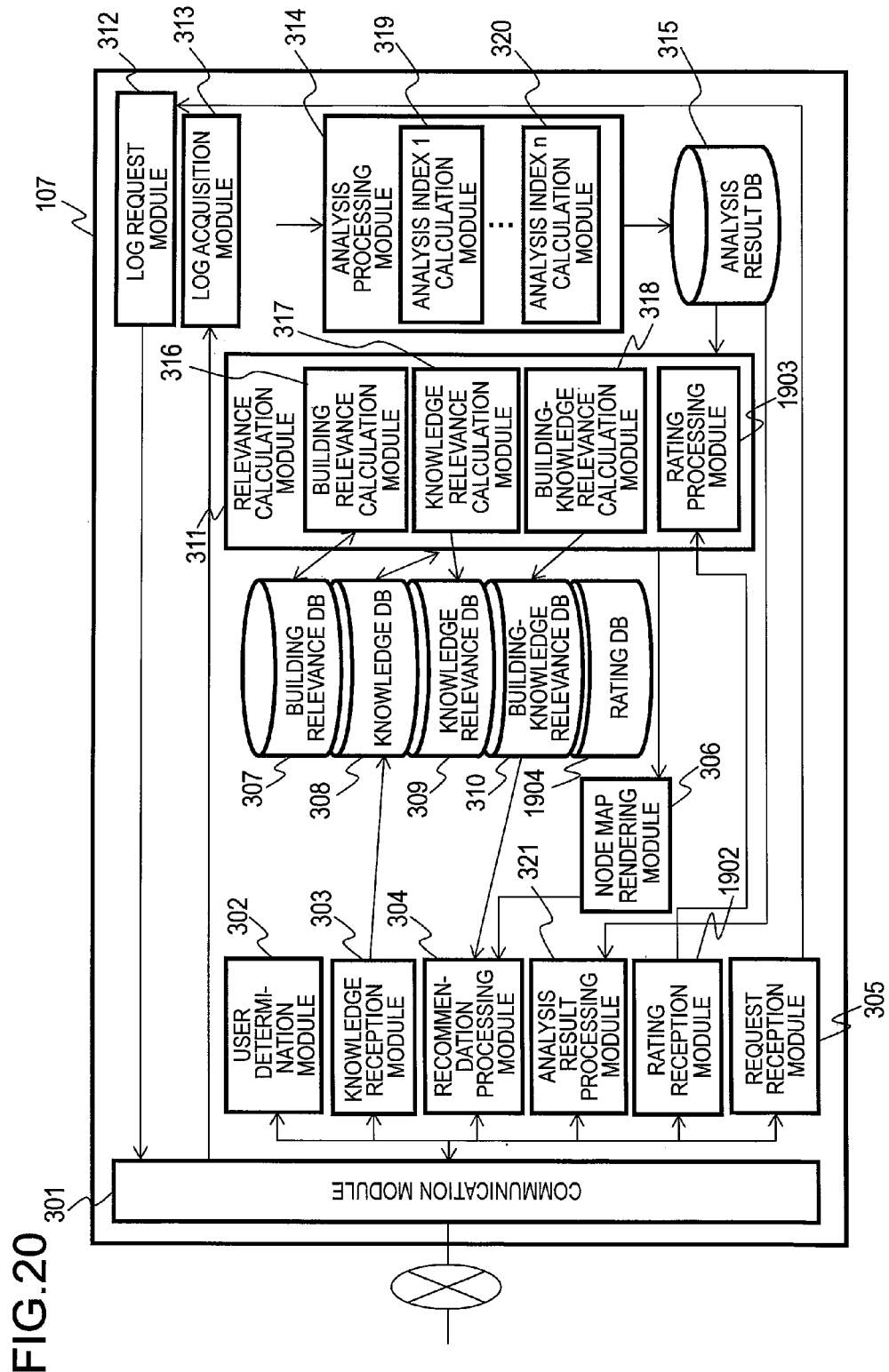
FIG. 20 is a diagram illustrating an example of functional blocks of a knowledge recommendation service apparatus according to a second embodiment of this invention.

FIG. 20 is a diagram illustrating an example of functional blocks of a knowledge recommendation service apparatus 1901 according to the second embodiment. The knowledge recommendation service apparatus 1901 in the second embodiment includes, in addition to the components of the knowledge recommendation service apparatus 107 in the first embodiment, a rating reception module 1902, a rating processing module 1903, and a rating database 1904.

The user views the knowledges presented on the recommendation user terminal 108 and inputs ratings indicating whether or not the knowledges are useful. The input ratings are transmitted to the knowledge recommendation service apparatus 1901 via the network.

The rating reception module 1902 receives the ratings via the communication module 301 to be transmitted to the rating processing module 1903. The rating processing module 1903 performs processing to be described later based on the received ratings to be stored in the rating database 1904.

The building-knowledge relevance calculation module 318 calculates by the method to be described later the building-knowledge relevance with the rating result reflected. The node map rendering module 306 uses the building-knowledge relevance with the rating result reflected to create the node map.

Figure 21:
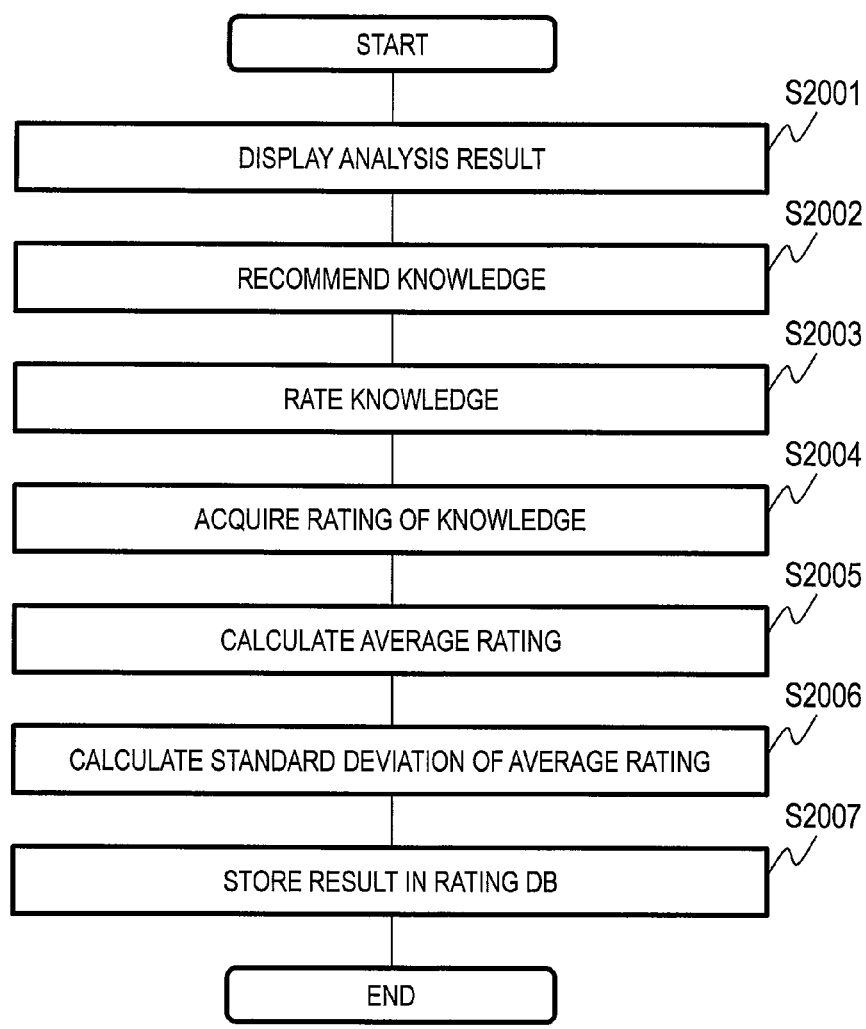
FIG. 21 is a chart illustrating an example of a flow of processing of rating knowledges.

FIG. 21 is a chart illustrating an example of a flow of processing of rating the knowledges. The recommendation user terminal 108 displays an analysis result of an analysis ID in an arbitrary period of an arbitrary building requested by the recommendation user (S2001) and displays corresponding knowledges to recommend the knowledges to the user (S2002). Seeing the recommended knowledges, the user evaluates how useful the knowledges are for the analysis result, and rates the knowledges (S2003).

The rating reception module 1902 acquires the ratings input to the recommendation user terminal 108 via the communication module 301 (S2004). The rating processing module 1903 acquires, for the knowledges to which the ratings are given, information on the past rating results from the rating database 1904, and based on the acquired past rating results and the latest rating result, calculates an average value of the ratings (S2005).

Then, in order to normalize the calculated average value of the ratings, the rating processing module 1903 calculates a standard deviation of the rating average value (S2006), and stores the calculated standard deviation in the rating database 1904 (S2007).

FIG. 22 is a diagram illustrating an example of a user interface 2101 for inputting the ratings to the recommended knowledges. The user interface 2101 is a screen displayed on the recommendation user terminal 108 when the knowledges are recommended from the knowledge recommendation service apparatus 1901. As in the first embodiment, the user interface 2101 includes the knowledge recommendation area 1503 as well as the analysis result area 1502, knowledge input area 1504, and screen switching area 1505 (not shown).

The knowledge recommendation area 1503 includes the knowledge recommendation table 1510, the button 1511 for moving to a node map display screen, and a rating input field 2102. The rating input field 2102 is a field for inputting ratings so as to correspond to the respective knowledges in the knowledge recommendation table 1510.

The user sees the presented analysis result and the recommended knowledges and determines usefulness of the knowledges for the analysis result to input the ratings. In the example illustrated in FIG. 22, a rating may be input in 5 levels. As the numerical value of the rating becomes higher, it is indicated that the knowledge becomes more useful.

FIG. 23 is a diagram illustrating data structure of a rating database 2201 (corresponding to the rating database 1904 of FIG. 20). The result processed by the rating processing module 1903 is stored in the rating database 2201. The rating database 2201 includes an analysis ID 2202, a knowledge ID 2203, the number of ratings 2204, an average rating 2205, and a normalized average rating value 2206.

The number of ratings 2204 is the number of ratings performed in the past for a combination of the analysis ID 2202 and the knowledge ID 2203. The average rating 2205 is an average point of the past ratings for the combination of the analysis ID 2202 and the knowledge ID 2203. The normalized average rating value 2206 is a standard deviation calculated by a deviation value calculation method with an average value of 50. It should be noted, however, that for example, the deviation value may be calculated by another deviation value calculation method, such as a deviation value calculation method with an average value of 0.

The building-knowledge relevance calculation module 318 calculates the building-knowledge relevance with the rating result reflected by Equation (4) below. In other words, the building-knowledge relevance with the rating result reflected is calculated by multiplying the final building-knowledge relevance value calculated in the processing flow illustrated in FIG. 5 by the normalized average rating value. In this manner, in recommending knowledges to the user, the knowledges may be recommended in an order reflecting the rating result.

final building-knowledge relevance value with rating result reflected=final building-knowledge relevance value×normalized average rating value  [Equation 4]

Figure 24:
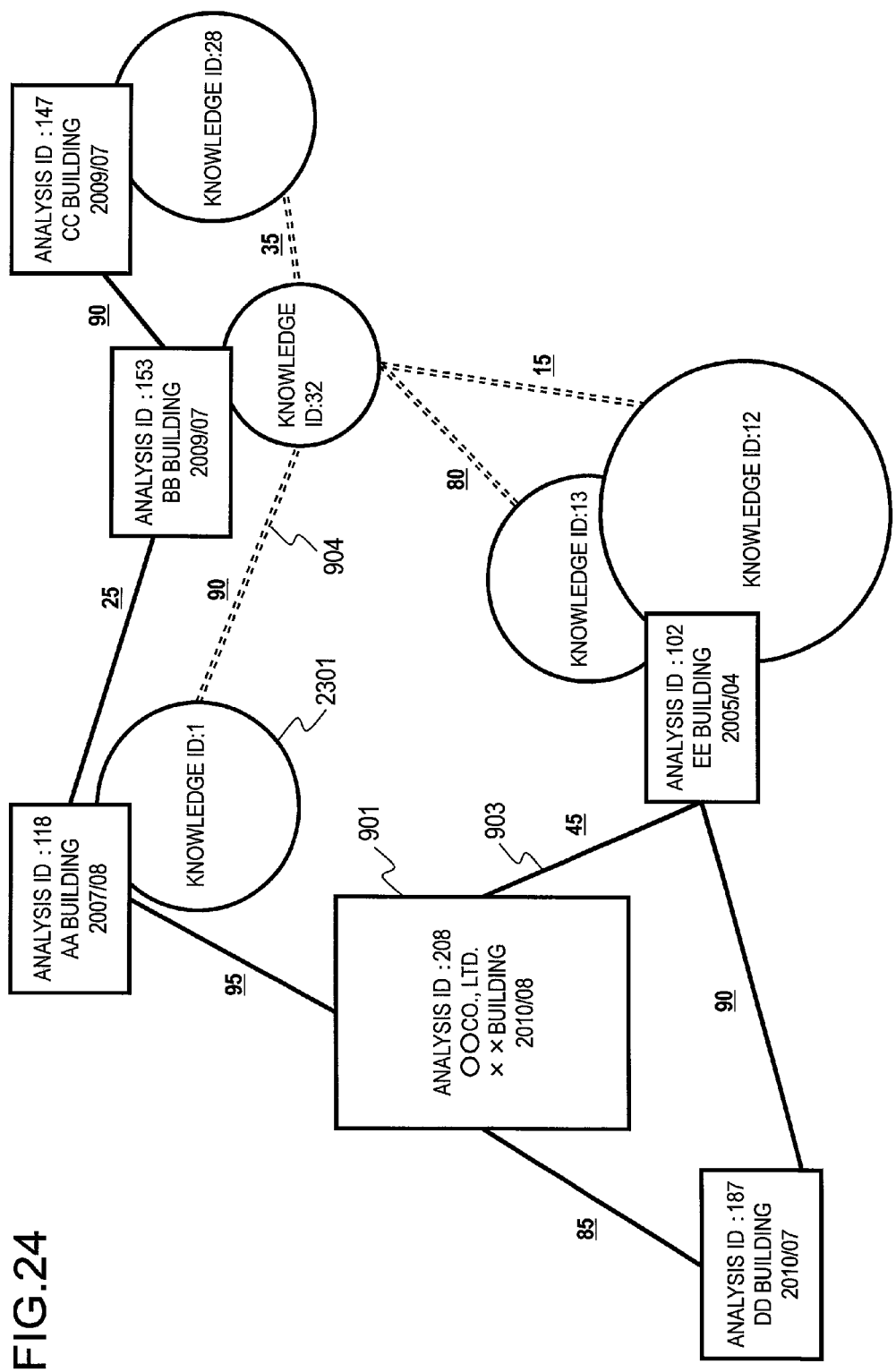
FIG. 24 is a diagram illustrating an example of a building-knowledge relevance node map on which a rating result is reflected.

FIG. 24 is a diagram illustrating an example of a building-knowledge relevance node map on which the rating result is reflected. In the building-knowledge relevance node map on which the rating result is reflected, the diameter of a node of a knowledge ID illustrated by the circle is rendered in proportion to the average rating 2205 of rating data 2201. In other words, as the average rating 2205 becomes higher, the diameter of the node of the knowledge ID illustrated by the circle becomes larger. In this manner, the user may easily understand, by visually checking the size of the circle, whether or not the knowledge is useful.

It should be noted that in the above description, the usefulness of the recommended knowledges is evaluated by rating. For example, a system may be employed in which, for a knowledge that is clearly unuseful, not only the evaluation is set low but also the knowledge may be deleted so that the knowledge is not recommended later.

As described above, according to the second embodiment, an input of an evaluation on the presented information is received, the input evaluation is used to weight the relevance between each of the physical amounts and each of the pieces of information, and the pieces of information are presented in order of the weighted relevance. In this manner, high-quality information to which the evaluation is reflected may be presented.

Moreover, an input of an evaluation on the presented information is received, and the information is presented by a method that allows the level of the input evaluation to be visually checked. In this manner, the user may visually check the evaluation on the presented information and easily determine whether or not the knowledge is useful.

Third Embodiment

Next, the example in which the computer system according to this invention is applied to the building energy management system—daily report combined analysis tool is described. A building energy management system is a system for recording operations of equipment, facilities, and the like of a building. The building manager records a daily management record as a daily report. A log of the building energy management system is treated as an APS log, and the daily report is treated as a knowledge so that the past daily reports may be recommended depending on an analysis result of the building energy management system log and a daily report on a date when a similar building operation was performed may be viewed.

Figure 25:
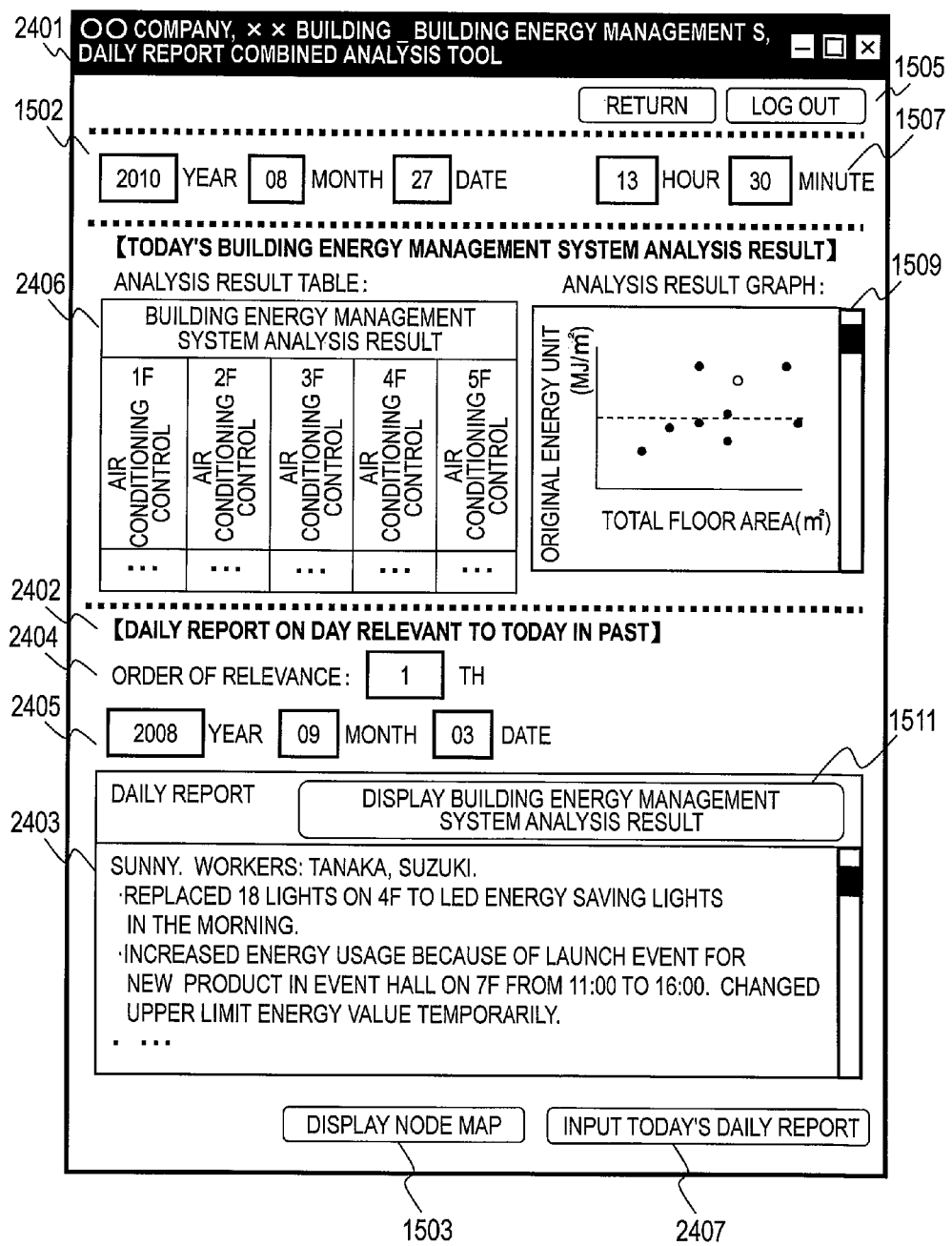
FIG. 25 is a diagram illustrating an example of a user interface when the computer system according to this invention is applied to a building energy management system—daily report combined analysis tool.

FIG. 25 is a diagram illustrating an example of a user interface when the computer system according to this invention is applied to the building energy management system—daily report combined analysis tool. A user interface 2401 adapted to the building energy management system—daily report combined analysis tool includes, as with the user interface illustrated in FIG. 16, an analysis result display area 1502. In this embodiment, today's building energy management system analysis result 2406 is shown in the analysis result display area 1502.

In a knowledge recommendation area 2402, a past daily report 2403 corresponding to the building energy management system analysis result is presented along with an order of relevance 2404, and a date 2405 on which the daily report was created. In the knowledge recommendation area 2402, a button 2406 for moving to a screen for displaying the building energy management system analysis result on the date when the past daily report was created, and a button 2407 for moving to a screen for inputting today's daily report are further displayed.

According to this embodiment, even when a transfer or generational change of the building manager is made, the knowledges may be shared by referring to know-how of the past daily report.

As described above, according to the third embodiment, in the case where the computer system according to this invention is applied to the building energy management system—daily report combined analysis tool, useful daily reports considering not only the relevance between the analysis results of the building energy management system log or the relevance between daily reports, but also the relevance between each of the analysis results of the building energy management system log and each of the daily reports may be presented.

Although the detailed description of this invention has been given referring to the accompanying drawings, this invention is not limited to such specific configurations, and shall encompass various modifications and equivalent configurations within the scope of the appended claims.

What is claimed is:

1. A computer system, comprising:
   a processor for executing a program;
   a computer storing the program executed by the processor;
   a first database storing a relevance between physical amounts measured under conditions that are different in at least one of time and place; and
   a second database for storing a relevance between pieces of information including texts corresponding to the measured physical amounts,
   wherein the processor is configured to:
   calculate, based on the relevance between the physical amounts stored in the first database and the relevance between the pieces of information stored in the second database, a relevance between each of the measured physical amounts and each of the pieces of information, and store the calculated relevance between each of the physical amounts and each of the pieces of information in a third database; and
   refer to, when the physical amounts are input, the third database to present information relevant to the input physical amounts.

2. The computer system according to claim 1, wherein the processor is further configured to:
   filter the relevance between the physical amounts and the relevance between the pieces of information by a predetermined threshold; and
   combine a link between the physical amounts and a link between the pieces of information which have relevance higher than the predetermined threshold to calculate the relevance between each of the physical amounts and each of the pieces of information.

3. The computer system according to claim 1, wherein the processor is further configured to:
   analyze the input physical amounts and hold an analysis result in an analysis result database;
   calculate, for the analysis result stored in the analysis result database, the relevance between the physical amounts; and
   use, of a link between the physical amounts and a link between the pieces of information corresponding to the link between the physical amounts, a link having a higher relevance value to calculate the relevance between each of the measured physical amounts and each of the pieces of information corresponding to the physical amounts.

4. The computer system according to claim 1, wherein the processor generates data for graphically displaying the relevance between the physical amounts stored in the first database and the relevance between the pieces of information stored in the second database.

5. The computer system according to claim 1, wherein the processor is further configured to:
   extract one or more nouns from text included in the pieces of information corresponding to the physical amounts; and
   calculate, depending on a number of the extracted nouns that overlap, the relevance between the pieces of information.

6. The computer system according to claim 1, wherein the processor extracts, of a link between the physical amounts and a link between the pieces of information corresponding to the link between the physical amounts, a link having a higher relevance value, and calculates, based on relevance of the extracted link and a distance of the extracted link from each of the physical amounts, the relevance between each of the physical amounts and each of the pieces of information.

7. The computer system according to claim 1, wherein the processor generates data for displaying the measured physical amounts and knowledges corresponding to the physical amounts on one screen.

8. The computer system according to claim 1, wherein the processor is further configured to:
   receive an input of an evaluation of information that is presented;
   use the input evaluation to weight the relevance between each of the physical amounts and each of the pieces of information, which is stored in the third database; and
   present the pieces of information in order of the weighted relevance.

9. The computer system according to claim 4, wherein the processor is further configured to:
   receive an input of an evaluation information that is presented; and
   present the information by a method that allows a level of the input evaluation to be visually checked.

10. The computer system according to claim 1, further comprising:
    a user information database for storing information on a user of the computer system,
    wherein the processor determines, based on the information on the user stored in the user information database, whether to permit the user to input the pieces of information corresponding to the physical amounts.

11. An information presentation method using a computer system, the computer system comprising:
    a processor for executing a program;
    a computer storing the program executed by the processor;
    a first database storing a relevance between physical amounts measured under conditions that are different in at least one of time and place; and
    a second database storing a relevance between pieces of information including texts corresponding to the measured physical amounts;
    the information presentation method comprising:
    calculating, based on the relevance between the physical amounts stored in the first database and the relevance between the pieces of information stored in the second database, a relevance between each of the measured physical amounts and each of the pieces of information;
    storing the calculated relevance between each of the physical amounts and each of the pieces of information in a third database; and
    referring to, when the physical amounts are input, the third database to present information relevant to the input physical amounts.

12. The information presentation method using a computer system according to claim 11,
    wherein the calculating of the relevance between each of the measured physical amounts and each of the pieces of information comprises:
    filtering the relevance between the physical amounts and the relevance between the pieces of information by a predetermined threshold; and
    combining a link between the physical amounts and a link between the pieces of information which have relevance higher than the predetermined threshold to calculate the relevance between each of the physical amounts and each of the pieces of information.

13. The information presentation method using a computer system according to claim 11, wherein the calculating of the relevance between each of the measured physical amounts and each of the pieces of information comprises:
analyzing the input physical amounts and holding an analysis result in an analysis result database;
calculating, for the analysis result stored in the analysis result database, the relevance between the physical amounts; and
using, of a link between the physical amounts and a link between the pieces of information corresponding to the link between the physical amounts, a link having a higher relevance value to calculate the relevance between each of the physical amounts and each of the pieces of information.

14. The information presentation method using a computer system according to claim 11, further comprising generating data for graphically displaying the relevance between the physical amounts stored in the first database and the relevance between the pieces of information stored in the second database.

15. The information presentation method using a computer system according to claim 11, further comprising:
extracting one or more nouns from text included in the pieces of information corresponding to the physical amounts; and
calculating, depending on a number of the extracted nouns that overlap, the relevance between the pieces of information.

16. The information presentation method using a computer system according to claim 11,
wherein the calculating of the relevance between each of the measured physical amounts and each of the pieces of information comprises extracting, of a link between the physical amounts and a link between the pieces of information corresponding to the link between the physical amounts, a link having a higher relevance value, and calculating, based on relevance of the extracted link and a distance of the extracted link from each of the physical amounts, the relevance between each of the physical amounts and each of the pieces of information.

17. The information presentation method using a computer system according to claim 11, further comprising generating data for displaying the measured physical amounts and knowledges corresponding to the physical amounts on one screen.

18. The information presentation method using a computer system according to claim 11, wherein the presenting of the information comprises:
receiving an input of an evaluation of information that is presented;
using the input evaluation to weight the relevance between each of the physical amounts and each of the pieces of information, which is stored in the third database; and
presenting the pieces of information in order of the weighted relevance.

19. The information presentation method using a computer system according to claim 14, wherein the presenting of the information comprises:
receiving an input of an evaluation of information that is presented; and
presenting the information by a method that allows a level of the input evaluation to be visually checked.

20. The information presentation method using a computer system according to claim 11,
wherein the computer system further comprises a user information database for storing information on a user of the computer system, and
wherein the information presentation method further comprises determining, based on the information on the user stored in the user information database, whether to permit the user to input the pieces of information corresponding to the physical amounts.

* * * * *